US012620699B2

(12) United States Patent
Ejiri

(10) Patent No.: US 12,620,699 B2
(45) Date of Patent: May 5, 2026

(54) ELECTRONIC COMPONENT

(71) Applicant: Murata Manufacturing Co., Ltd., Nagaokakyo (JP)

(72) Inventor: Keisuke Ejiri, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 93 days.

(21) Appl. No.: 18/403,725

(22) Filed: Jan. 4, 2024

(65) Prior Publication Data

US 2024/0154302 A1 May 9, 2024

Related U.S. Application Data

(63) Continuation of application No. PCT/JP2022/024539, filed on Jun. 20, 2022.

(30) Foreign Application Priority Data

Jul. 5, 2021 (JP) ................................ 2021-111444

(51) Int. Cl.
*H01Q 1/50* (2006.01)
*H01P 3/12* (2006.01)

(52) U.S. Cl.
CPC *H01Q 1/50* (2013.01); *H01P 3/12* (2013.01)

(58) Field of Classification Search
CPC .... H01P 3/06; H01P 3/085; H01P 3/12; H01P 3/121; H01Q 1/50; H01Q 9/0407;
(Continued)

(56) References Cited

U.S. PATENT DOCUMENTS 9,786,995 B2 * 10/2017 Kirino .................... H01Q 13/10
2011/0187614 A1 * 8/2011 Kirino .................... G01S 7/032
333/239

(Continued)

FOREIGN PATENT DOCUMENTS

EP 3340369 A1 6/2018
JP 2000-269707 A 9/2000
(Continued)

OTHER PUBLICATIONS

International Search Report and Written Opinion mailed on Sep. 6, 2022, received for PCT Application PCT/JP2022/024539, filed on Jun. 20, 2022, 08 pages including English Translation.

*Primary Examiner* — Tung X Le
(74) *Attorney, Agent, or Firm* — XSENSUS LLP

(57) ABSTRACT

A pair of first members each have an electrically conductive surface and a disposed to face each other. A plurality of second members each made of an electrically conductive material are disposed between the pair of first members. The plurality of second members are arranged in a periodic pattern in at least one direction parallel to the conductive surface and disposed between the pair of first members. A dielectric member is disposed between each of the plurality of second members and each of the pair of first members. The dielectric member is in contact with the plurality of second members and with the pair of first members. An electronic component is provided that is configured to control propagation of radio waves such as microwaves, millimeter waves, or sub-millimeter waves, and that allows for reduced deflection of the conductive surface.

19 Claims, 19 Drawing Sheets

(58) Field of Classification Search
CPC .......... H01Q 13/10; H01Q 3/06; H01Q 3/085; H01Q 3/12; H01Q 3/121
See application file for complete search history.

(56) References Cited

U.S. PATENT DOCUMENTS

| | | | | |
|---|---|---|---|---|
| 2016/0036111 | A1* | 2/2016 | Gregoire | H01Q 13/00 333/240 |
| 2018/0026378 | A1* | 1/2018 | Hadavy | H01Q 21/0087 343/771 |
| 2020/0043875 | A1* | 2/2020 | Zaman | H01P 5/107 |
| 2020/0076038 | A1* | 3/2020 | Kamo | H01P 3/123 |
| 2020/0227807 | A1* | 7/2020 | Kirino | H05B 6/707 |
| 2021/0210857 | A1* | 7/2021 | Sayama | H01Q 9/0457 |

FOREIGN PATENT DOCUMENTS

| | | | |
|---|---|---|---|
| JP | 2011-527171 | A | 10/2011 |
| JP | 2012-209655 | A | 10/2012 |
| JP | 2020-113979 | A | 7/2020 |
| WO | 2018/139046 | A1 | 8/2018 |

* cited by examiner

ELECTRONIC COMPONENT

CROSS-REFERENCE TO RELATED APPLICATIONS

The present application is a continuation of PCT application PCT/JP2022/024539, filed Jun. 20, 2022, and claims priority to Japanese application JP 2021-111444, filed Jul. 5, 2021, the entire contents of each of which being incorporated herein by reference.

TECHNICAL FIELD

The present disclosure relates to an electronic component that controls propagation of radio waves such as microwaves, millimeter waves, sub-terahertz waves, or terahertz waves.

BACKGROUND ART

Known microwave devices include a transmission line disposed between parallel metal plates (see, for example, Patent Document 1). A microwave device disclosed in Patent Document 1 includes a plurality of metal posts protruding from one metal plate to the other metal plate. The plurality of metal posts are arranged periodically, and the cut-off condition is satisfied for a radio wave that propagates in the transmission line. The plurality of metal posts serve to block radio wave propagation in a direction other than the direction of the transmission line.

Side walls rise from edges of the metal plate provided with the metal posts. The other metal plate is screwed onto the top face of the side walls. A gap is defined between each of the plurality of metal posts, and the metal plate that is not provided with the metal posts.

CITATION LIST

Patent Document

Patent Document 1: Japanese Unexamined Patent Application Publication (Translation of PCT Application) No. 2011-527171

SUMMARY

Technical Problems

In a microwave device according to the related art, one metal plate is supported only at its edges by the other metal plate. As recognized by the present inventor, this makes the metal plates susceptible to deflection. To maintain the spacing between the pair of metal plates, each of the pair of metal plates is required to have a certain mechanical strength. For example, to ensure a predetermined mechanical strength, each metal plate needs to have an increased thickness. This makes it difficult to reduce the size and thickness of the microwave device.

It is an aspect of the present document to provide an electronic component that is configured to control propagation of radio waves such as microwaves, millimeter waves, sub-terahertz waves, or terahertz waves, and that allows for reduced deflection of a conductive surface.

Solutions to Problems

According to one aspect of the present disclosure, there is provided an electronic component including:

a pair of first members each have an electrically conductive surface and a disposed to face each other; and a plurality of second members each made of an electrically conductive material are disposed between the pair of first members. The plurality of second members are arranged in a periodic pattern in at least one direction parallel to the conductive surface and disposed between the pair of first members. A dielectric member is disposed between each of the plurality of second members and each of the pair of first members. The dielectric member is in contact with the plurality of second members and with the pair of first members. An electronic component is provided that is configured to control propagation of radio waves such as microwaves, millimeter waves, or sub-millimeter waves, and that allows for reduced deflection of the conductive surface.

Advantageous Effects

Radio wave propagation is controlled by the plurality of members. The dielectric member is disposed between each member and the conductive surface, and the dielectric member is in contact with the member and the conductive surface. This configuration allows for reduced deflection of the conductive members.

DESCRIPTION OF EMBODIMENTS

First Embodiment

An electronic component according to a first embodiment is described below with reference to FIGS. 1A to 2D.

Figure 1A:
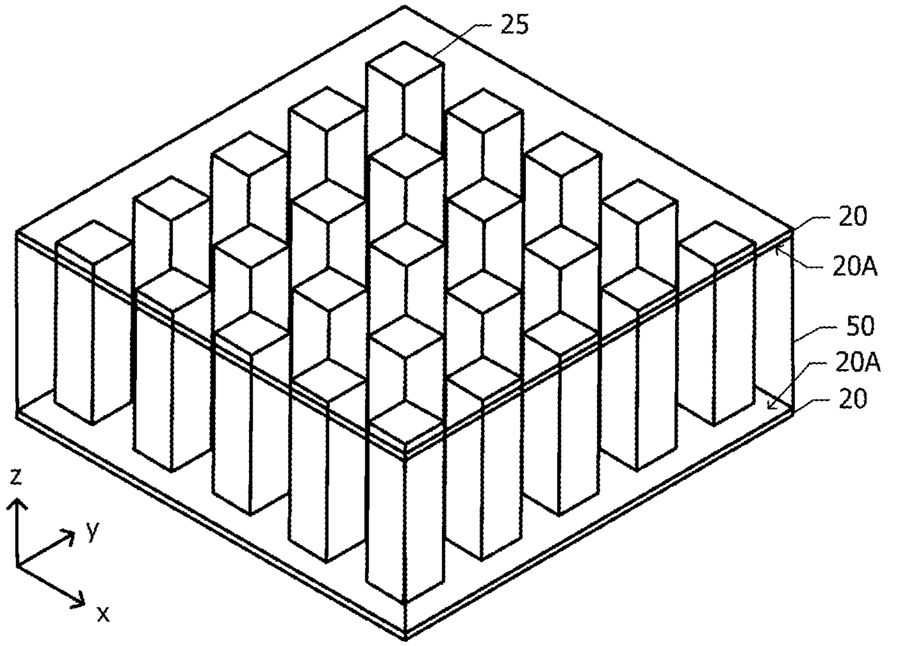
FIGS. 1A and 1B are a partially see-through perspective view and a cross-sectional view, respectively, of an electronic component according to a first embodiment.
Figure 1B:
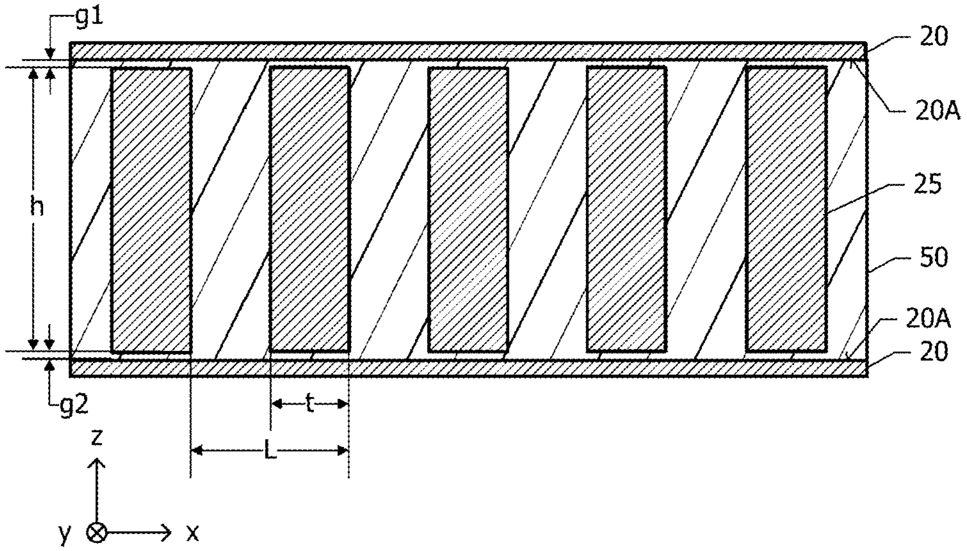

FIGS. 1A and 1B are a partially see-through perspective view and a cross-sectional view, respectively, of the electronic component according to the first embodiment. A pair of conductive members 20 (first members), which are plate-shaped and have electrical conductivity, are disposed parallel to each other. The pair of conductive members 20 each have a conductive surface 20A with electrical conductivity. The conductive surface 20A of one conductive member 20, and the conductive surface 20A of the other conductive member 20 are opposite to each other (i.e., are opposing surfaces). An x-y-z orthogonal coordinate system with one conductive surface 20A serving as the x-y plane is defined. In the perspective view in FIG. 1A, the scales in the x- and y-directions need not be the same as the scale in the z-direction. The same is true for other figures.

A plurality of members 25 (second members) are arranged periodically (e.g., at a same pitch spacing, or according to a repeated spacing pattern) between the pair of conductive surfaces 20A. Each member 25 is made of an electrically conductive material, and in the form of a rectangular prism. In FIG. 1A, structural features hidden under the upper conductive member 20 are also depicted. The plurality of members 25 are, for example, arranged periodically in the x-direction and the y-direction. For example, the plurality of members 25 are disposed at positions corresponding to the lattice points of a tetragonal lattice. A dielectric member 50 is disposed between the pair of conductive surfaces 20A. The dielectric member 50 may be a substantially rectangular piece disposed at a side (or each side) between conductive members 20, or may also be thicker so as to fill the voids between the members 25 throughout the space between the conductive members 20.

As illustrated in FIG. 1B, each of the plurality of members 25 is spaced apart from each of the pair of conductive surfaces 20A. The dielectric member 50 is disposed also between each of the plurality of members 25 and each of the pair of conductive surfaces 20A. The dielectric member 50 is disposed also between the plurality of members 25. That is, each end face of each member 25 in the z-direction is opposite to the conductive surface 20A with the dielectric member 50 interposed therebetween.

The dielectric member 50 is in close contact with each of the pair of conductive surfaces 20A, and each of the plurality of members 25. That is, the dielectric member 50 disposed between the member 25 and the conductive surface 20A is in close contact with both of the following surfaces: a surface of the member 25 that is positioned opposite to the conductive surface 20A; and the conductive surface 20A. Further, in areas where no member 25 is disposed, the dielectric member 50 extends from one conductive surface 20A to the other conductive surface 20A. In another embodiment, at least in some areas, the dielectric member 50 in some areas is in contact with the conductive surfaces 20A, but in other areas is in close proximity to (e.g., within 1% or less of the length of a member 25, but may not actually contact, the conductive surfaces 20A.

The electronic component according to the first embodiment is capable of blocking a radio wave at a specific frequency that propagates in the x-direction and the y-direction. Reference is now made to the relationship between the frequency or wavelength of the radio wave to be blocked (hereinafter, "target radio wave"), and the dimensions of the electronic component.

The dimension of each of the plurality of members 25 in the z-direction is denoted "h." The spacing between each of the plurality of members 25 and one conductive surface 20A is denoted "g1", and the spacing between each of the plurality of members 25 and the other conductive surface 20A is denoted "g2." The dimension of each of the plurality of members 25 in each of the x- and y-directions is denoted "t", and the period of the members 25 in each of the x- and y-directions is denoted "L." The speed of light in vacuum is denoted "$c_0$", and the effective relative permittivity of the space between the pair of conductive surfaces 20A is denoted εr.

The electronic component according to the first embodiment has the capability to sufficiently block a radio wave at a frequency f within a range given by an equation below.

[Math. 1]

$$\frac{c_0}{2p\sqrt{\varepsilon_r}} \le f \le \frac{c_0}{p\sqrt{\varepsilon_r}} \tag{1}$$

$$p = t + 2\sqrt{h^2 + \left(\frac{L-t}{2}\right)^2}$$

When the wavelength of a radio wave to be blocked is denoted λ, the member 25 preferably has a dimension "h" in the z-direction that is substantially equal to λ/4. Each of the spacings g1 and g2 is preferably less than or equal to λ/4.

Reference is now made to materials used for individual constituent elements of the electronic component. The conductive member 20 is made of a metal such as copper, silver, or gold. The member 25 is made of a metal such as copper, silver, or solder. The dielectric member 50 is made of a dielectric material, for example, a ceramic material or resin. Preferred examples of the resin may include epoxy, polyimide, liquid crystal polymer, and fluorocarbon resin.

A manufacturing method for the electronic component according to the first embodiment is now described below with reference to FIGS. 2A to 2D. FIGS. 2A to 2D are cross-sectional views of the electronic component according to the first embodiment in its mid-manufacture stages.

Figure 2A:
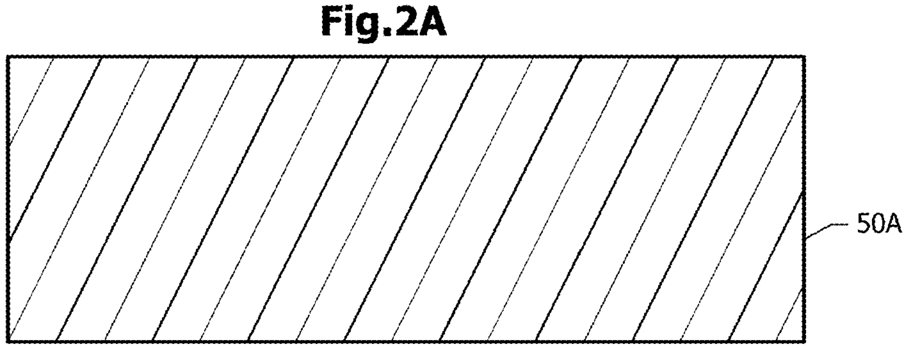
FIGS. 2A to 2D are cross-sectional views of the electronic component according to the first embodiment in its mid-manufacture stages.
Figure 2B:
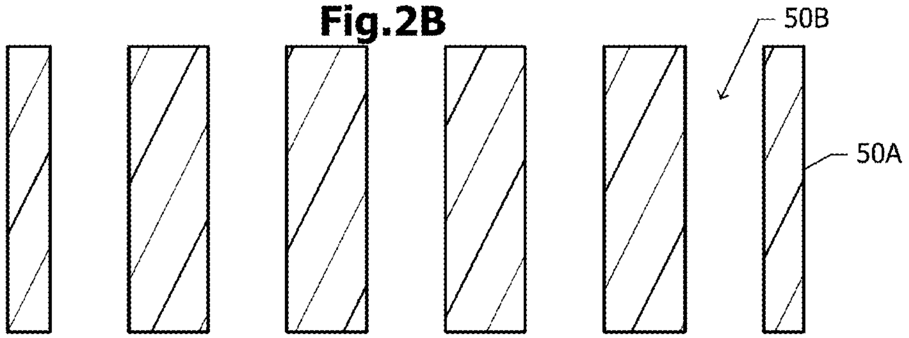

As illustrated in FIG. 2A, a plate-shaped dielectric base member 50A is prepared. As illustrated in FIG. 2B, a plurality of through-holes 50B are formed in the dielectric base member 50A. The plurality of through-holes 50B extend through the dielectric base member 50A in the thickness direction. Each through-hole 50B can be formed by use of a laser, a mechanical drill, or other devices. The plurality of through-holes 50B are formed at locations where the members 25 (FIG. 1A) are to be disposed.

Figure 2C:
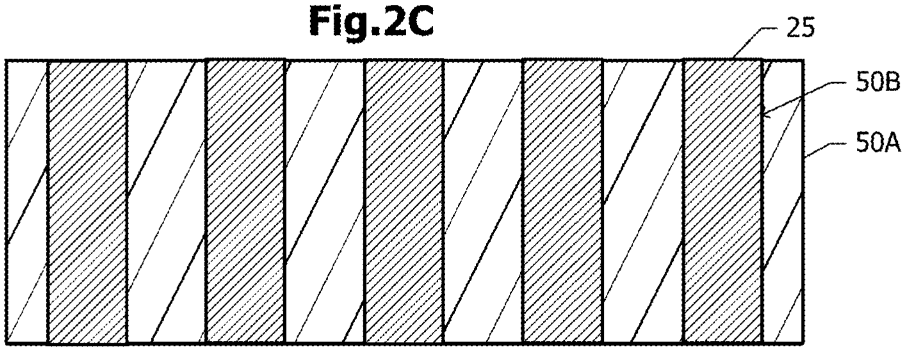

As illustrated in FIG. 2C, each of the plurality of through-holes 50B is then filled with the member 25. The filling of the through-hole 50B with the member 25 can be performed by, for example, pouring a molten resin into the through-hole 50B, and allowing the molten metal to solidify. Alternatively, the filling of the through-hole 50B with the member 25 can be performed by pushing a pin-shaped metal member into the through-hole 50B.

Figure 2D:
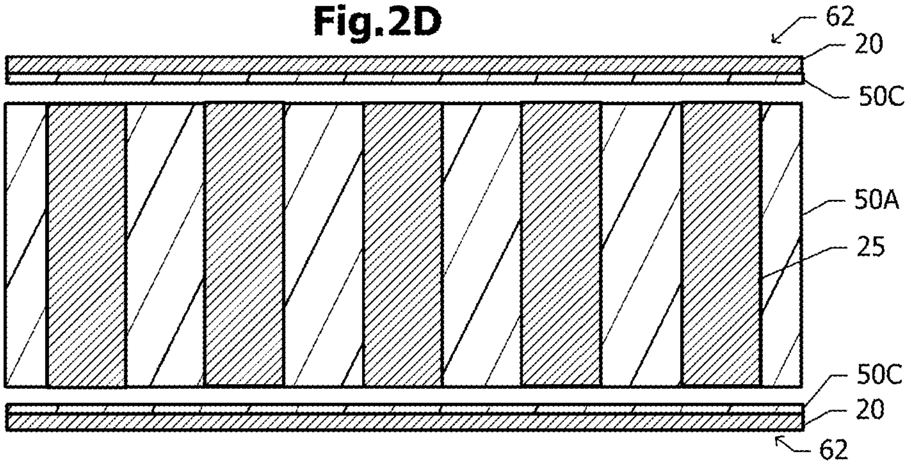

As illustrated in FIG. 2D, a single-sided copper clad sheet 62 is joined to each face of a composite member that includes the dielectric base member 50A and the members 25, in such a way that the copper foil of the single-sided copper clad sheet 62 is exposed on the outer side portion. FIG. 2D illustrates a state before the single-sided copper clad sheet 62 is attached. In one example, the single-sided copper clad sheet 62 is joined by means of, for example, thermocompression bonding. In another example, the single-sided copper clad sheet 62 may be bonded with an adhesive to each face of the composite member that includes the dielectric base member 50A and the members 25.

The copper foil of the single-sided copper clad sheet 62 constitutes each of the pair of conductive members 20 (FIG. 1A, 1B) of the electronic component. The dielectric base member 50A, and a dielectric film 50C of the single-sided copper clad sheet 62 constitute the dielectric member 50 (FIG. 1A, 1B) of the electronic component.

Advantageous effects according to the first embodiment are now described below.

With the electronic component according to the first embodiment, the presence of the plurality of members 25 makes it possible to control the propagation of radio waves such as microwaves (e.g., signals at frequencies lower than 30 GHz), millimeter waves (e.g., signals at frequencies higher than or equal to 27 GHz and lower than or equal to 300 GHz), sub-terahertz waves (e.g., signals at frequencies higher than or equal to 100 GHz and lower than 1 THz), or terahertz waves (signals at frequencies higher than or equal to 1 THz). More specifically, radio waves that propagate in the x-direction and the y-direction can be blocked. For example, microwaves or millimeter waves are used in fifth-generation mobile communication systems. Sub-terahertz waves or terahertz waves correspond in terms of frequency to the sub-terahertz band or the terahertz band, and are considered to be used in sixth-generation mobile communication systems.

According to the first embodiment, the pair of plate-shaped conductive members 20 are in contact with the dielectric member 50. The dielectric member 50 thus serves as a support structure that mechanically supports the conductive members 20. This makes it possible to reduce deflection of the conductive members 20. Further, a thin metal foil or other such material with no self-supporting force may be used as the conductive member 20. This allows for reduced size and weight of the electronic component.

Further, the pair of conductive members 20 are joined (e.g., by thermocompression bonding) to the dielectric member 50. This allows one conductive member 20 to be secured and supported to the other conductive member 20 without use of a mechanical fastener such as a screw.

Figure 3:
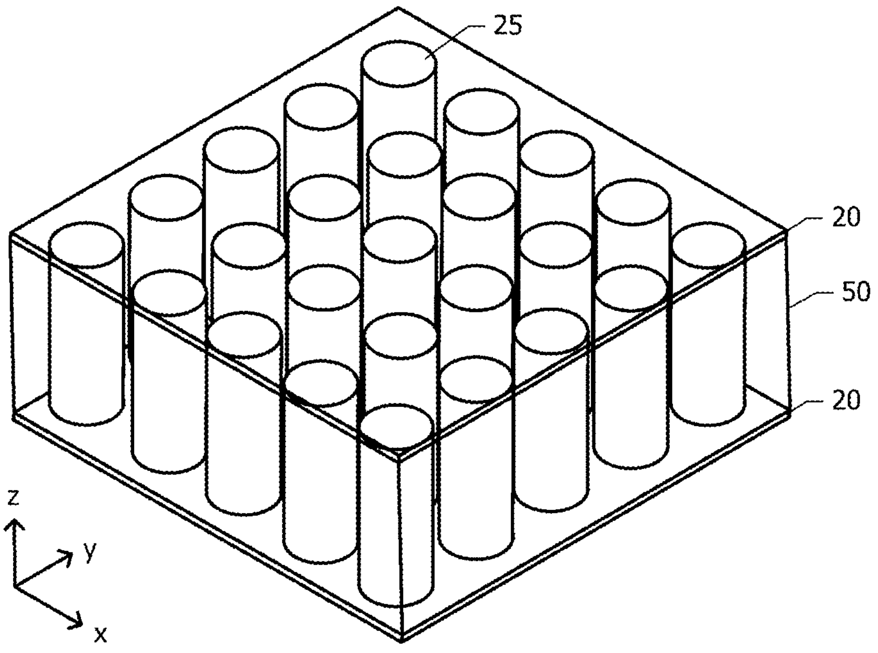
FIG. 3 is a partially see-through perspective view of an electronic component according to a modification of the first embodiment.

Reference is now made to FIG. 3 to describe an electronic component according to a modification of the first embodiment.

FIG. 3 is a partially see-through perspective view of the electronic component according to the modification of the first embodiment. According to the first embodiment, each member 25 is in the form of a quadrangular prism. According to this modification, by contrast, each member 25 is in the form of a circular cylinder. Advantageous effects similar to those according to the first embodiment are attained even if each member 25 is in the form of a circular cylinder as described above.

According to the first embodiment, the plurality of members 25 are arranged periodically in two dimensions, the x-direction and the y-direction. It may suffice, however, that the members 25 be arranged periodically in at least one direction. To block a radio wave, the members 25 are preferably disposed in at least two rows. According to the first embodiment, the plurality of members 25 are positioned at the lattice points of a tetragonal lattice. Alternatively, however, the members 25 may be arranged in another manner that allows a two-dimensional periodic structure to be obtained. For example, the plurality of members 25 may be positioned at the lattice points of a triangular lattice.

Further, according to the first embodiment, two electrically conductive plates disposed in parallel to each other are used as the conductive members 20. Alternatively, however, the conductive members 20 to be used may be of another structure. For example, a tubular member may be used. The cross-section of the tubular member perpendicular to the y-direction in FIG. 1A extends along the perimeter of a rectangle. In this case, a pair of wall portions of the tubular member that are perpendicular to the z-direction serve as the conductive members 20, and the surface on the inner side portion of each conductive member 20 serves as the conductive surface 20A.

Reference is now made to FIGS. 4A to 8B to describe manufacturing methods for an electronic component according to other various modifications of the first embodiment.

Figure 4A:
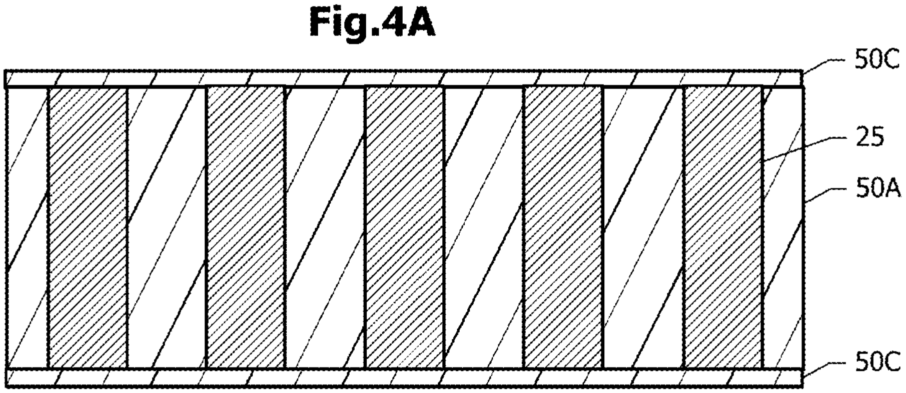
FIGS. 4A and 4B are cross-sectional views of an electronic component according to one modification of the first embodiment in its mid-manufacture stages.
Figure 4B:
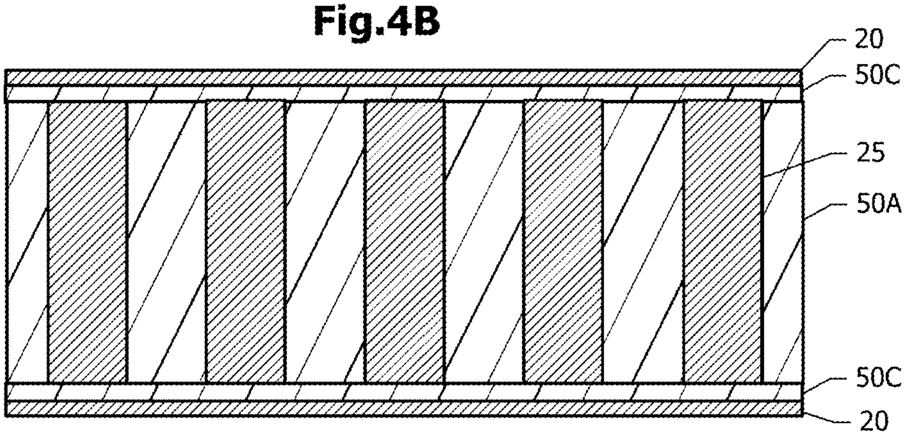

FIGS. 4A and 4B are cross-sectional views of an electronic component according to one modification of the first embodiment in its mid-manufacture stages.

The composite member illustrated in FIG. 2C that includes the dielectric base member 50A and the members 25 is fabricated through the same steps as those described above with reference to FIGS. 2A to 2C. Then, as illustrated in FIG. 4A, a pair of dielectric films 50C are formed, one on each face of the composite member. Each dielectric film 50C can be formed by, for example, applying an insulating coating, and allowing the applied coating to solidify.

Subsequently, as illustrated in FIG. 4B, the conductive member 20 is formed on the surface on the outer side portion of each of the pair of dielectric films 50C. The conductive member 20 can be formed by, for example, plating of a metal.

Figure 5A:
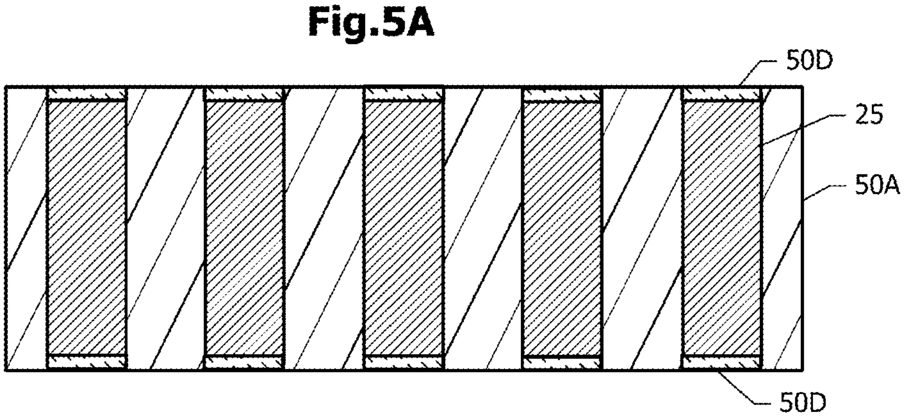
FIGS. 5A and 5B are cross-sectional views of an electronic component according to another modification of the first embodiment in its mid-manufacture stages.
Figure 5B:
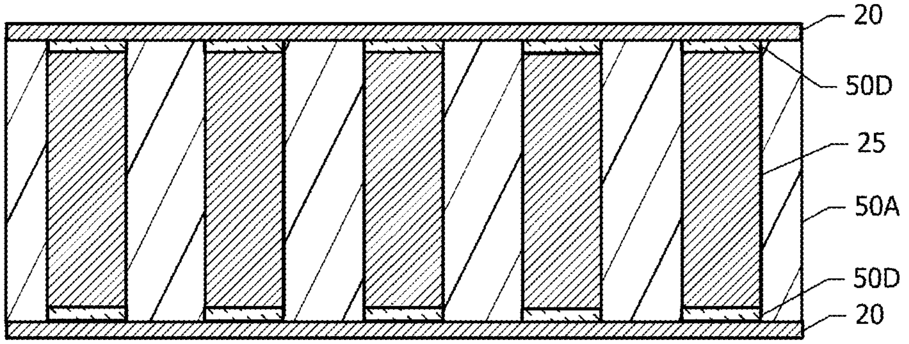

FIGS. 5A and 5B are cross-sectional views of an electronic component according to another modification of the first embodiment in its mid-manufacture stages.

The composite member illustrated in FIG. 2C that includes the dielectric base member 50A and the members 25 is fabricated through the same steps as those described above with reference to FIGS. 2A to 2C. The surface of each member 25 (FIG. 2C) is exposed at the surface on each side of the composite member. The exposed surface of the member 25 is oxidized to form a dielectric portion 50D in an end portion of the member 25 in the z-direction. If copper is used for the member 25, the dielectric portion 50D thus formed is a copper oxide.

As illustrated in FIG. 5B, the conductive members 20 are formed on opposite surfaces of the composite member where the dielectric base member 50A and the dielectric portion 50D are exposed. Each conductive member 20 can be formed by, for example, plating of a metal. In one exemplary configuration, the resulting plated metal film may cover the lateral face of the dielectric base member 50A. In this case, the conductive members 20 formed on the opposite surfaces of each of the dielectric base member 50A and the dielectric portion 50D become contiguous and integrated with each other at the lateral face of the dielectric base member 50A. That is, the pair of conductive members 20 disposed on opposite faces of the dielectric base member 50A are integrated with each other.

Figure 6A:
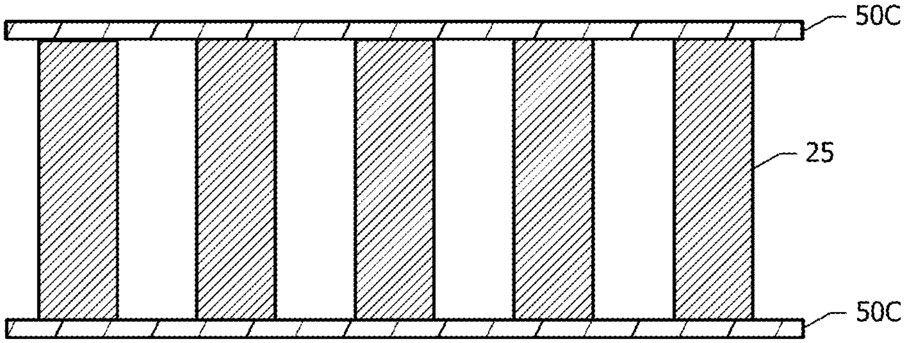
FIGS. 6A and 6B are cross-sectional views of an electronic component according to still another modification of the first embodiment in its mid-manufacture stages.
Figure 6B:
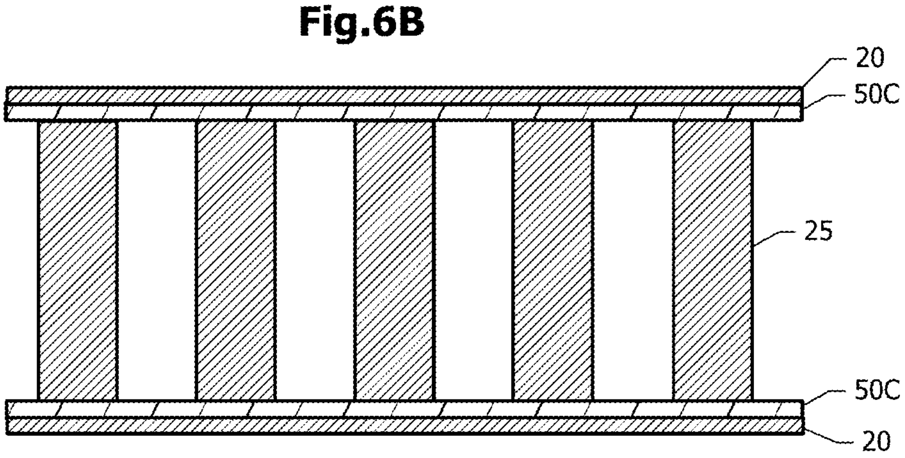

FIGS. 6A and 6B are cross-sectional views of an electronic component according to still another modification of the first embodiment in its mid-manufacture stages.

As illustrated in FIG. 6A, the plurality of members 25, each made of a metal pin, are placed in a self-supporting manner on a surface of one dielectric film 50C. Each member 25 can be placed in a self-supporting manner by means of, for example, thermocompression bonding or adhesive bonding. The other dielectric film 50C is bonded to the distal ends of the plurality of members 25 placed in a self-supporting manner on the surface of the one dielectric film 50C.

As illustrated in FIG. 6B, the conductive member 20 is formed on the surface on the outer side portion of each of the pair of dielectric films 50C. The conductive member 20 can be formed by, for example, plating of a metal. In the electronic component fabricated by the manufacturing method according to this modification, the space between the plurality of members 25 is filled with air.

FIGS. 7A to 7F are cross-sectional views of an electronic component according to still another modification of the first embodiment in its mid-manufacture stages.

Figure 7A:
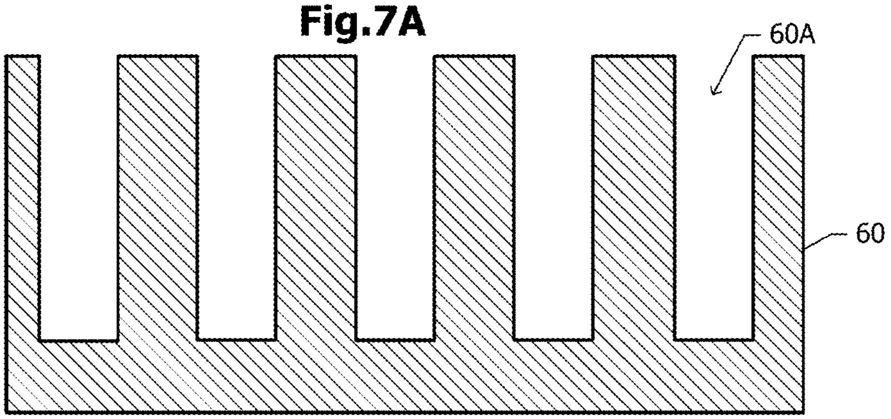
FIGS. 7A to 7C are cross-sectional views of an electronic component according to still another modification of the first embodiment in its mid-manufacture stages.
Figure 7B:
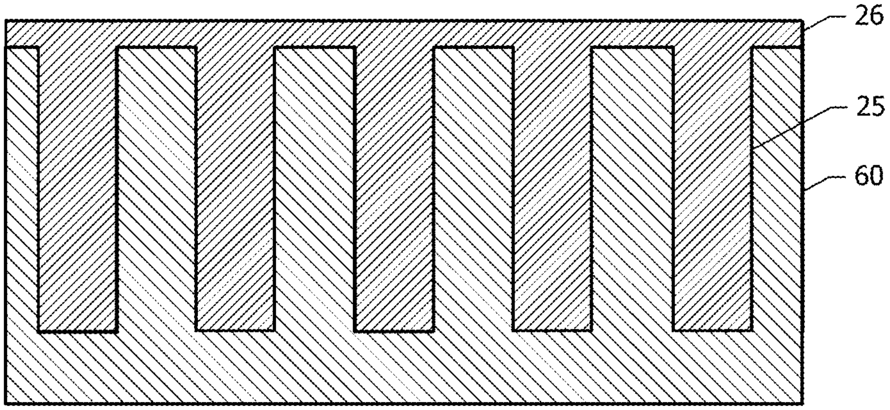
Figure 7C:
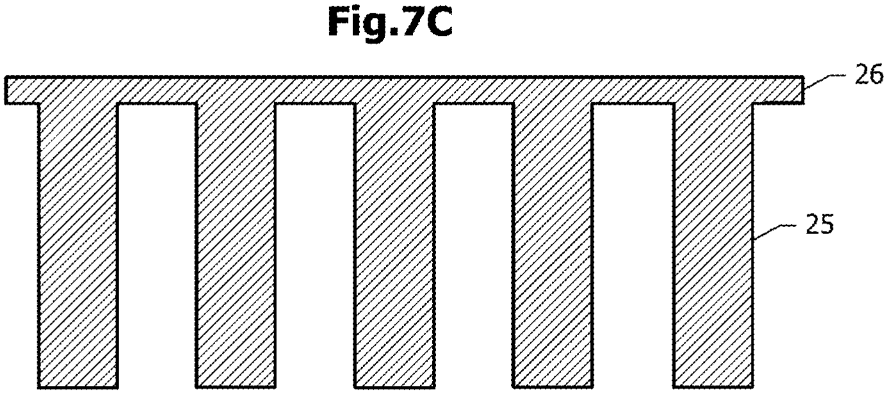

As illustrated in FIG. 7A, a mold 60 is prepared. The mold 60 has a recess 60A at locations where the plurality of members 25 are to be disposed. As illustrated in FIG. 7B, a molten metal is poured into the mold 60, and then allowed to solidify. The plurality of members 25, and a plate-shaped connecting part 26 that connects the members 25 are thus formed. As illustrated in FIG. 7C, the mold 60 (FIG. 7B) is removed from the plurality of members 25 and the connecting part 26.

Figure 7D:
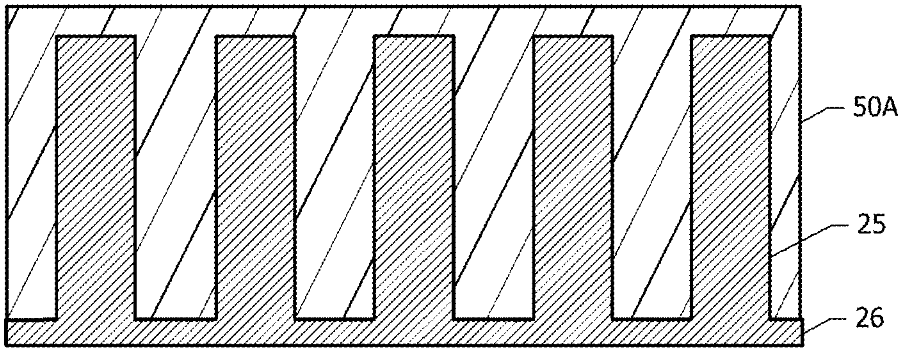
FIGS. 7D to 7F are cross-sectional views of an electronic component according to still another modification of the first embodiment in its mid-manufacture stages.

As illustrated in FIG. 7D, the gaps between the plurality of members 25 of the resulting structure that includes the members 25 and the connecting part 26 are then filled with resin. The resin is allowed to solidify to form the dielectric base member 50A. Thermosetting resin or ultraviolet-curing resin can be used as the resin.

Figure 7E:
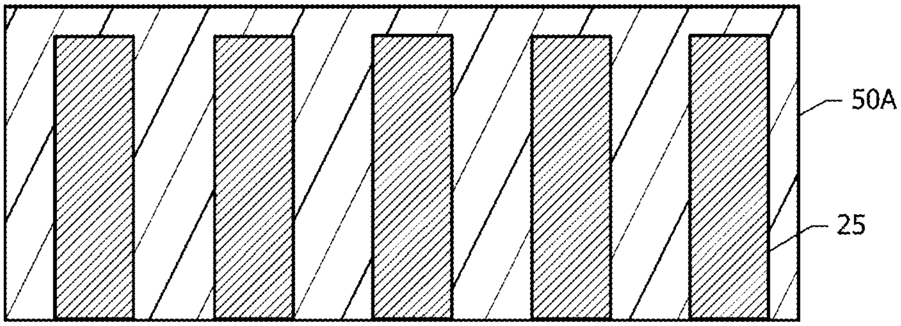

As illustrated in FIG. 7E, the connecting part 26 (FIG. 7D) is removed. The connecting part 26 can be removed by use of, for example, a grinder or a cutter. The dielectric base member 50A and the members 25 are thus exposed on one face of the composite member that includes the dielectric base member 50A and the members 25.

Figure 7F:
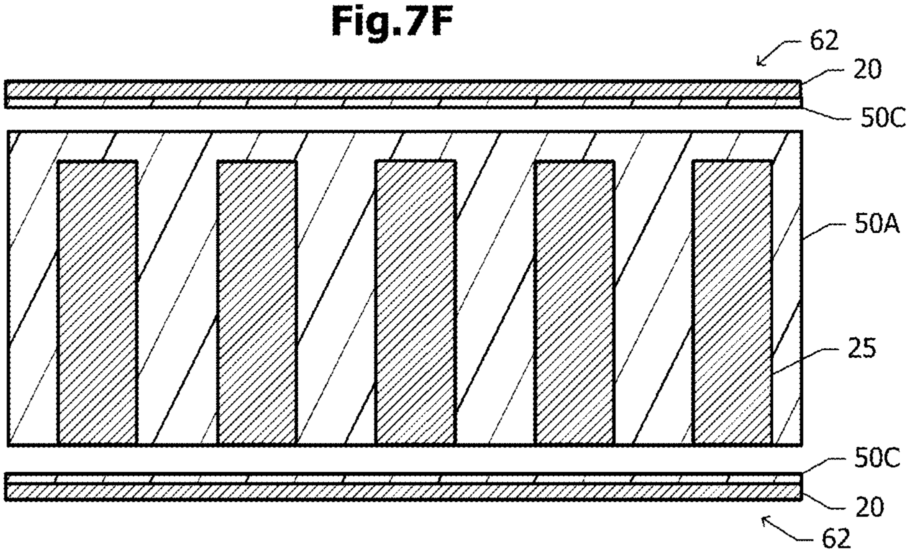

As illustrated in FIG. 7F, the single-sided copper clad sheet 62 is joined to each face of the composite member that includes the dielectric base member 50A and the members 25, in such a way that the copper foil of the single-sided copper clad sheet 62 is exposed on the outer side portion. The single-sided copper clad sheet is also called single-sided copper foil sheet. FIG. 7F depicts a state before the single-sided copper clad sheet 62 is joined.

Figure 8A:
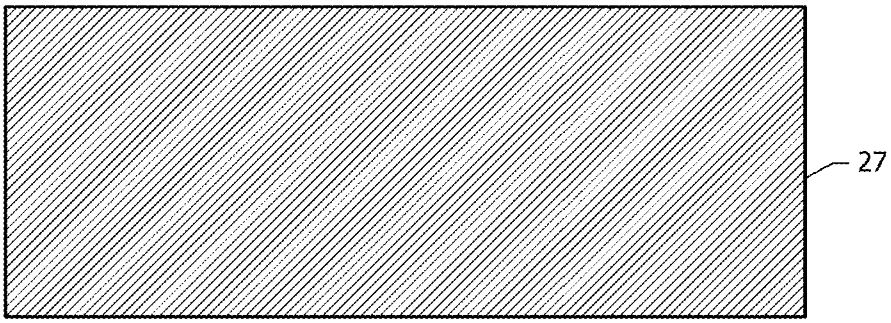
FIGS. 8A and 8B are cross-sectional views of an electronic component according to still another modification of the first embodiment in its mid-manufacture stages.
Figure 8B:
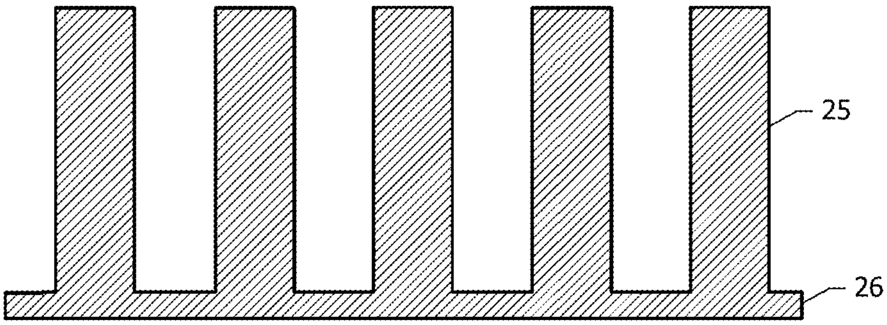

FIGS. 8A and 8B are cross-sectional views of an electronic component according to still another modification of the first embodiment in its mid-manufacture stages.

As illustrated in FIG. 8A, a lump of metal 27 is prepared. As illustrated in FIG. 8B, a structure including the members 25 and the connecting part 26 is carved out of the lump of metal 27. Subsequently, an electronic component is fabricated through steps similar to the steps described above with reference to FIGS. 7D to 7F.

Second Embodiment

Figure 9A:
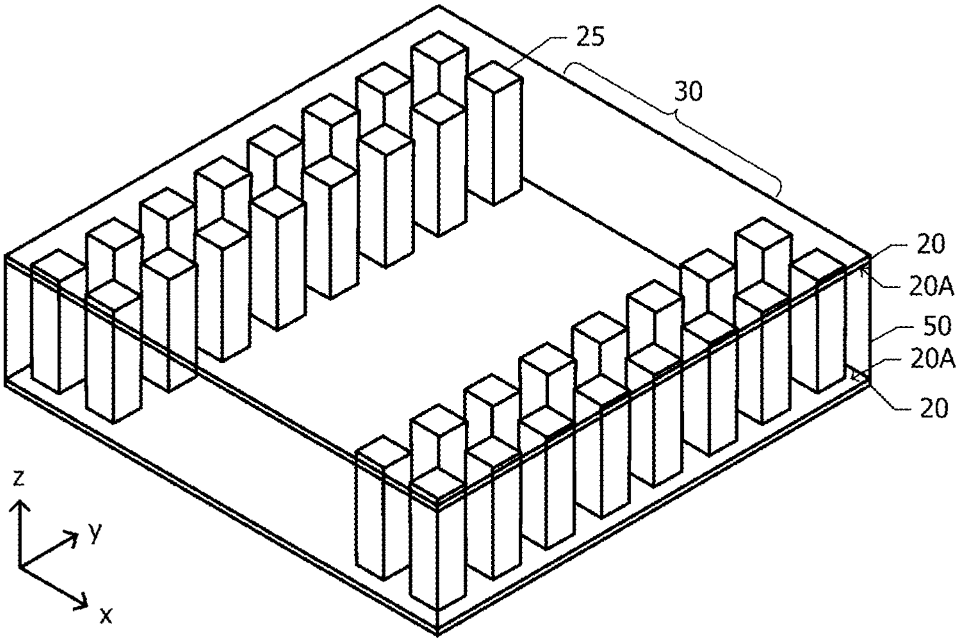
FIGS. 9A and 9B are a partially see-through perspective view and a cross-sectional view, respectively, of an electronic component according to a second embodiment.
Figure 9B:
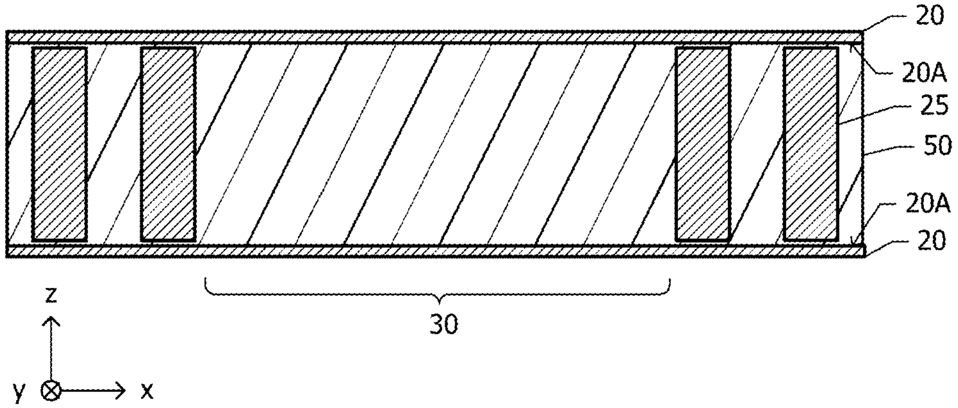

Reference is now made to FIGS. 9A and 9B to describe an electronic component according to a second embodiment. In the following description, structural features identical to those of the electronic component according to the first embodiment described above with reference to FIGS. 1A to 2D are not described in further detail.

FIGS. 9A and 9B are a partially see-through perspective view and a cross-sectional view, respectively, of the electronic component according to the second embodiment. According to the first embodiment (FIG. 1A), the plurality of members 25 are arranged evenly across the entirety of the pair of conductive surfaces 20A. According to the second embodiment, by contrast, no member 25 is disposed at a region of the conductive surfaces 20A that is elongated in the y-direction. The region where no member 25 is disposed is herein referred to as non-distribution region 30.

The non-distribution region 30 has a width (dimension in the x-direction) greater than or equal to twice the period of the members 25 in the y-direction. The plurality of members 25 arranged periodically in the y-direction are disposed on both sides of the non-distribution region 30 in the width direction of the non-distribution region 30. According to the second embodiment, the plurality of members 25 are disposed in two rows on each side of the non-distribution region 30. Alternatively, the members 25 may be disposed in only one row, or may be disposed in three or more rows.

The non-distribution region 30 serves as a waveguide that allows radio waves to propagate in the y-direction. With respect to the z-direction, the pair of conductive surfaces 20A confine radio waves, and with respect to the x-direction, the members 25 on both sides of the non-distribution region 30 confine radio waves.

Advantageous effects of the second embodiment are now described below. As with the first embodiment, the second embodiment also makes it possible to reduce deflection of the conductive members 20. Further, the dielectric member 50 is disposed between the pair of conductive surfaces 20A also at the non-distribution region 30. This makes it possible to reduce deflection of the conductive members 20 also at the non-distribution region 30.

Figure 10A:
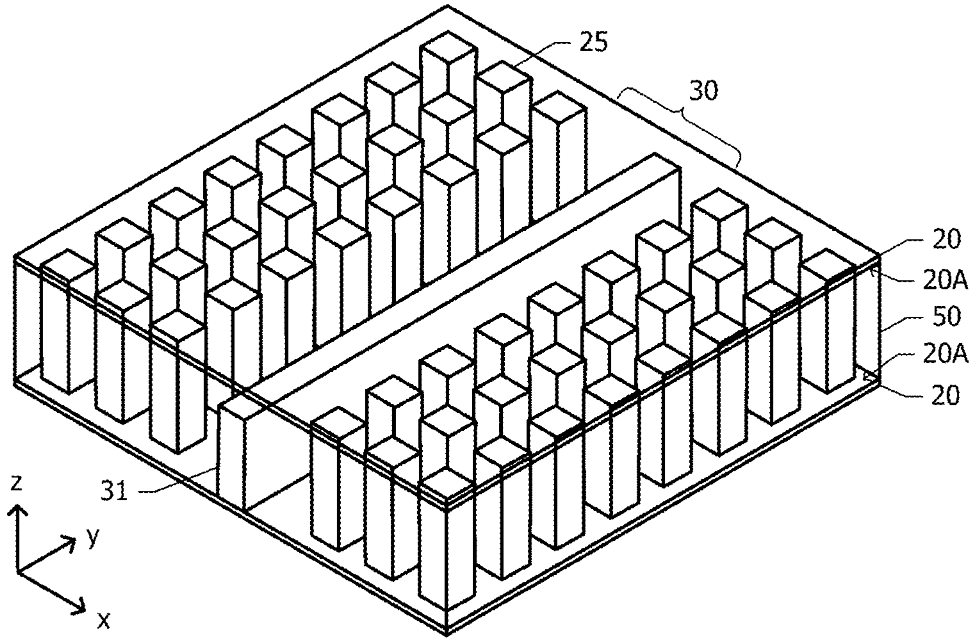
FIGS. 10A and 10B are a partially see-through perspective view and a cross-sectional view, respectively, of an electronic component according to a modification of the second embodiment.
Figure 10B:
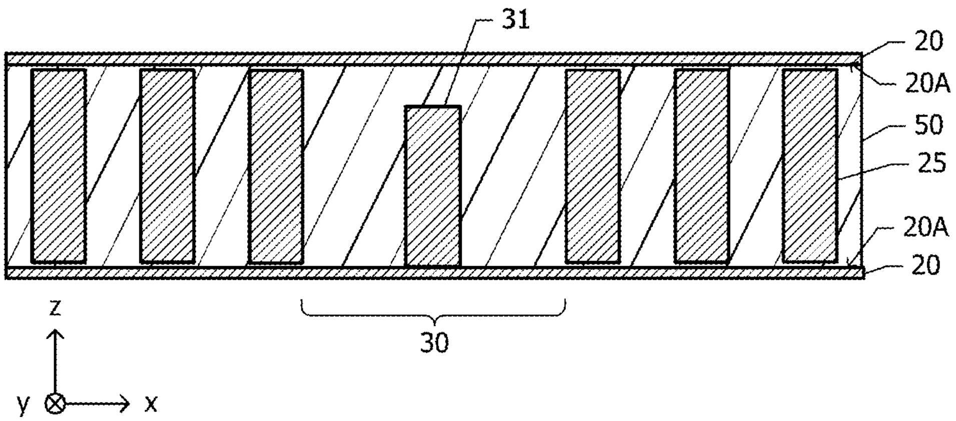

Reference is now made to FIGS. 10A and 10B to describe an electronic component according to a modification of the second embodiment.

FIGS. 10A and 10B are a partially see-through perspective view and a cross-sectional view, respectively, of the electronic component according to the modification of the second embodiment. According to this modification, a ridge member 31 is disposed at the non-distribution region 30. The ridge member 31 extends in the y-direction, and has electrical conductivity. The ridge member 31 is in contact with one conductive surface 20A (the lower positioned conductive surface 20A in FIGS. 10A and 10B) of the pair of conductive surfaces 20A. The ridge member 31 and the other conductive surface 20A (the higher positioned conductive surface 20A in FIGS. 10A and 10B) have a spacing between each other that is greater than the spacing between each of the plurality of members 25 and each of the pair of conductive surfaces 20A.

Mainly the space between the ridge member 31 and one conductive surface 20A serves as a waveguide that allows radio waves to propagate in the y-direction. The plurality of members 25 disposed on both sides of the non-distribution region 30 block radio waves that leak in the x-direction from the waveguide.

Reference is now made to a manufacturing method for the electronic component according to the modification of the second embodiment illustrated in FIGS. 10A and 10B.

For example, in the mid-manufacture stage of the electronic component according to the first embodiment as illustrated in FIG. 2B, with respect to the z-direction, the following two portions of the electronic component may be fabricated separately: a portion where the ridge member 31 is disposed; and a portion located above the top face of the ridge member 31. The two portions may be then simply stacked together. In this case, in the mid-manufacture stage illustrated in FIG. 2D, a cavity is formed in the dielectric film 50C in a region where the ridge member 31 is disposed. Then, prior to joining of the dielectric film 50C, the cavity is filled with a conductive material. This allows the ridge member 31 to be in contact with one conductive member 20.

Figure 11A:
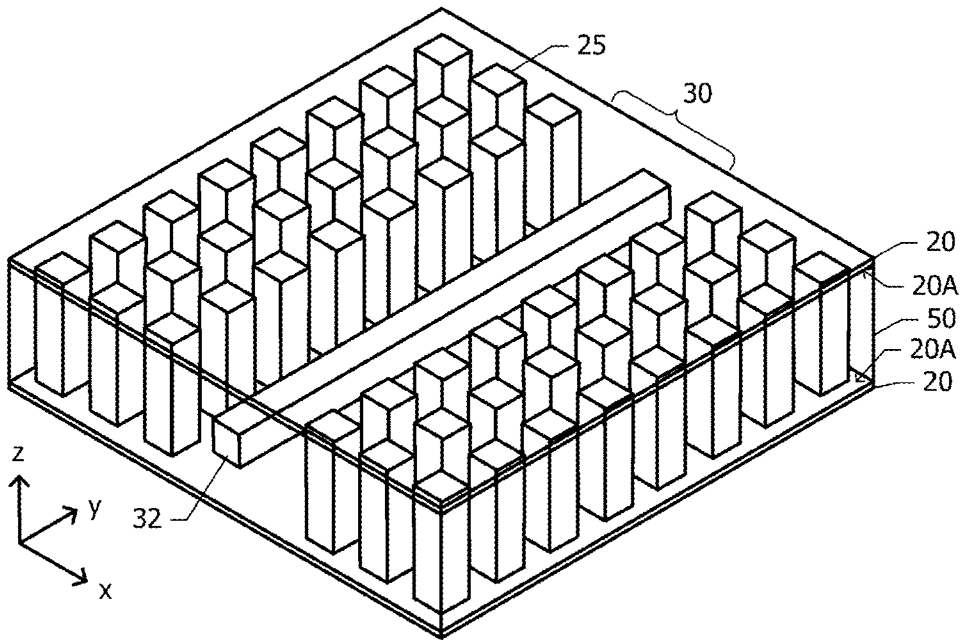
FIGS. 11A and 11B are a partially see-through perspective view and a cross-sectional view, respectively, of an electronic component according to another modification of the second embodiment.
Figure 11B:
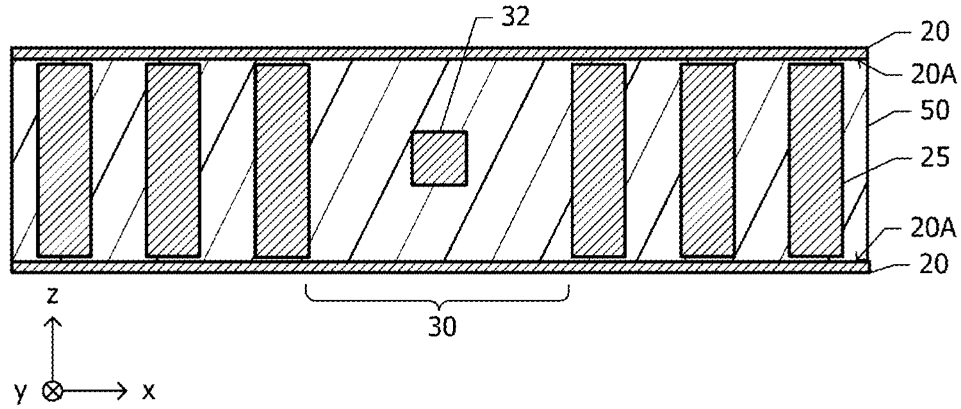

Reference is now made to FIGS. 11A and 11B to describe an electronic component according to another modification of the second embodiment.

FIGS. 11A and 11B are a partially see-through perspective view and a cross-sectional view, respectively, of the electronic component according to the other modification of the second embodiment. According to the modification illustrated in FIGS. 10A and 10B, the ridge member 31 is disposed at the non-distribution region 30. According to this modification, by contrast, a core member 32 is disposed at the non-distribution region 30. The core member 32 extends in the y-direction, and has electrical conductivity. The core member 32 is located at the center of the non-distribution region 30 with respect to the width direction (x-direction), and equidistant from the pair of conductive surfaces 20A. The core member 32 and each of the pair of conductive surfaces 20A have a spacing between each other that is greater than the spacing between each of the plurality of members 25 and each of the pair of conductive surfaces 20A. According to this modification, the core member 32 serves as the central conductor of a coaxial cable.

Reference is now made to a manufacturing method for the electronic component according to the modification of the second embodiment illustrated in FIGS. 11A and 11B.

For example, in the mid-manufacture stage of the electronic component according to the first embodiment as illustrated in FIG. 2B, with respect to the z-direction, the following three portions of the electronic component may be fabricated separately: a portion located below the core member 32; a portion where the core member 32 is disposed; and a portion located above the core member 32. The three portions may be then simply stacked together. Subsequently, the single-sided copper clad sheet 62 illustrated in FIG. 2D is joined to the resulting stack. The electronic component illustrated in FIGS. 11A and 11B is thus completed.

Third Embodiment

Figure 12A:
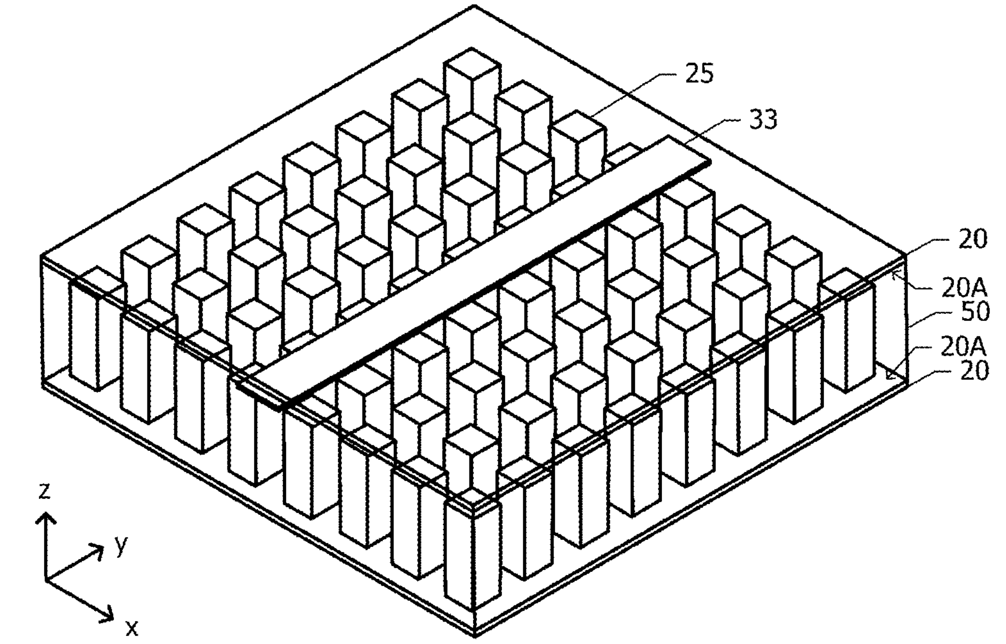
FIGS. 12A and 12B are a partially see-through perspective view and a cross-sectional view, respectively, of an electronic component according to a third embodiment.
Figure 12B:
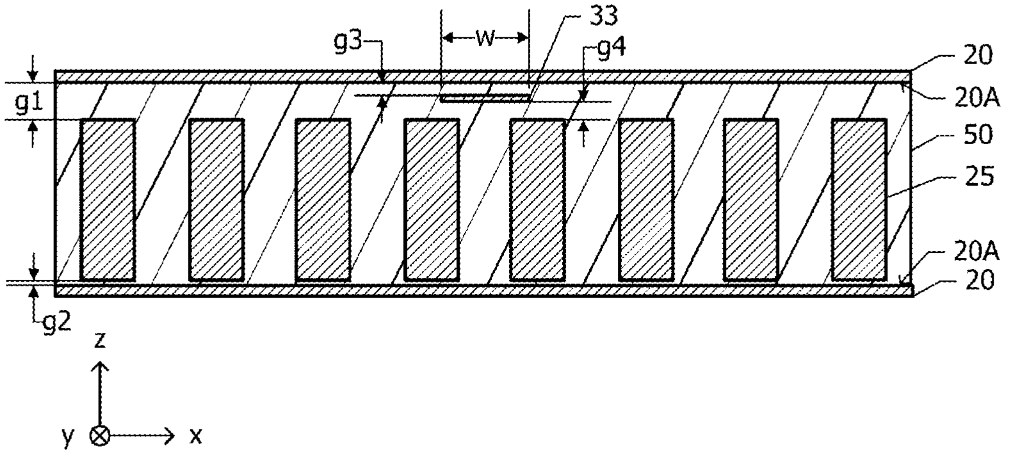

Reference is now made to FIGS. 12A and 12B to describe an electronic component according to a third embodiment. In the following description, structural features identical to those of the electronic component according to the first embodiment described above with reference to FIGS. 1A to 2D are not described in further detail.

FIGS. 12A and 12B are a partially see-through perspective view and a cross-sectional view, respectively, of the electronic component according to the third embodiment. According to the first embodiment (FIG. 1B), the spacing g1 between each of the plurality of members 25 and one conductive surface 20A of the pair of conductive surfaces 20A, and the spacing g2 between each of the plurality of members 25 and the other conductive surface 20A are both less than or equal to one-quarter of the wavelength of a target radio wave. According to the third embodiment, by contrast, the spacing g1 between each of the plurality of members 25 and the one conductive surface 20A is greater than the spacing g2 between each of the plurality of members 25 and the other conductive surface 20A. The spacing g1, which is the greater of the two spacings, is greater than or equal to one-quarter of the wavelength of the target radio wave.

A transmission line 33 is disposed between one conductive surface 20A of the pair of conductive surfaces 20A, and the plurality of members 25. The one conductive surface 20A is the conductive surface 20A with the greater spacing from each of the plurality of members 25. In one example, the center of the transmission line 33 in the width direction (x-direction) is located between two members 25 that are adjacent to each other in the x-direction as seen in plan view. The location of the transmission line 33 in the x-direction is not limited to the location depicted in FIG. 12B. The transmission line 33 and the one conductive surface 20A define a stripline.

In one example, the transmission line 33 has a width w less than or equal to one-half of the wavelength of a target radio wave. The transmission line 33 and one conductive surface 20A have a spacing g3 between each other that is less than or equal to one-quarter of the wavelength of the target radio wave. The transmission line 33 and the member 25 have a spacing g4 in the z-direction that is less than or equal to one-quarter of the wavelength of the target radio wave.

The plurality of members 25 reduce leakage, in the x-direction, of a radio-frequency signal transmitted through the stripline that includes the transmission line 33 and one conductive surface 20A.

Reference is now made to a manufacturing method for the electronic component according to the third embodiment.

In the mid-manufacture stage of the electronic component according to the first embodiment illustrated in FIG. 2D, as one single-sided copper clad sheet 62, a single-sided copper clad sheet with a copper foil patterned into the shape of the transmission line 33 is used. The transmission line 33 is thus formed. On top of the single-sided copper clad sheet 62 with the transmission line 33 formed as described above, the single-sided copper clad sheet 62 including the conductive member 20 is stacked. The electronic component according to the third embodiment is thus completed.

Advantageous effects of the third embodiment are now described below. As with the first embodiment, the third embodiment also makes it possible to reduce deflection of the conductive members 20.

Fourth Embodiment

Figure 13A:
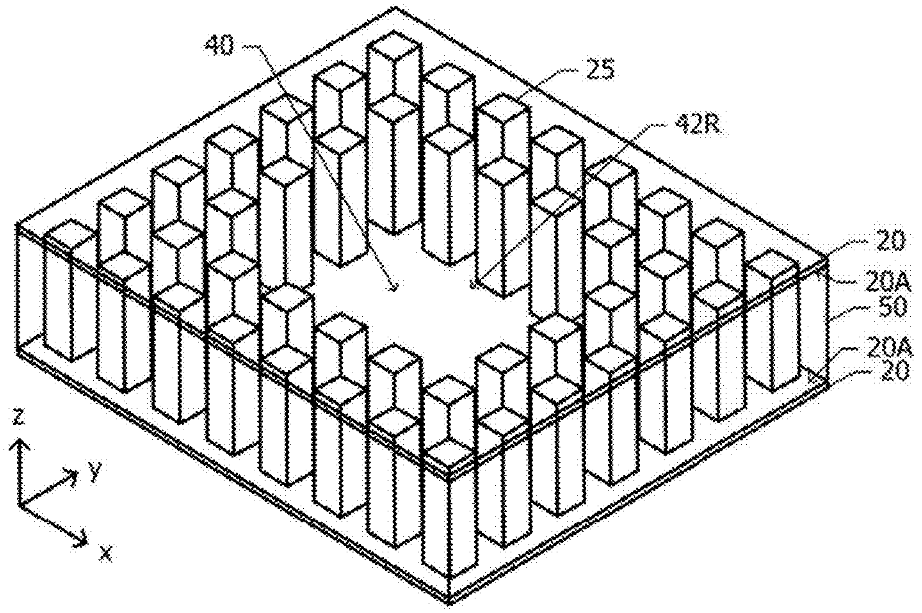
FIG. 13A is a partially see-through perspective view of an electronic component according to a fourth embodiment.
Figure 13B:
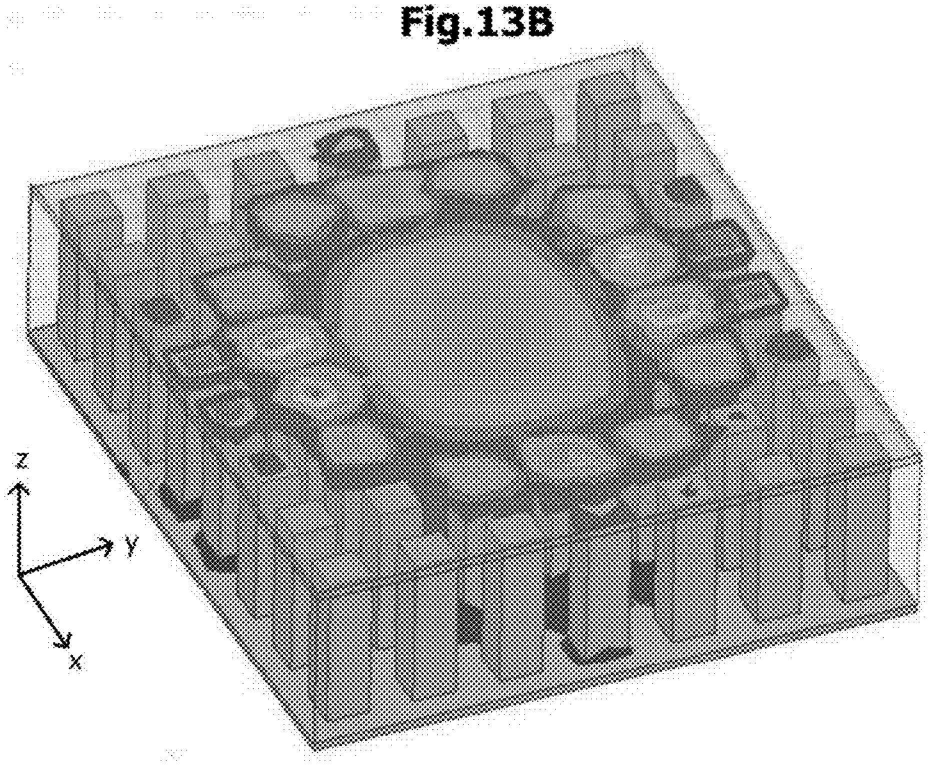
FIG. 13B is an image that illustrates the simulation results on electric field strength.

Reference is now made to FIGS. 13A and 13B to describe an electronic component according to a fourth embodiment. In the following description, structural features identical to those of the electronic component according to the first embodiment described above with reference to FIGS. 1A to 2D are not described in further detail.

FIG. 13A is a partially see-through perspective view of the electronic component according to the fourth embodiment. According to the first embodiment (FIG. 1A), the plurality of members 25 are arranged evenly across the entirety of the pair of conductive surfaces 20A. According to the fourth embodiment, by contrast, no member 25 is disposed at a region of each conductive surface 20A. The region where no member 25 is disposed is herein referred to as non-distribution region 40. The plurality of members 25 are disposed at a region surrounding the non-distribution region 40.

The respective dimensions in the x- and y-directions of the non-distribution region 40 are greater than or equal to twice the respective periods in the x- and y-directions of the plurality of members 25 that are arranged periodically in the x- and y-directions. In this case, the period in the x-direction is the center-to-center distance between two members 25 that are adjacent to each other in the x-direction, and the period in the y-direction is the center-to-center distance between two members 25 that are adjacent to each other in the y-direction. Radio waves are confined in the x-direction and the y-direction by means of the members 25 disposed around the non-distribution region 40. Consequently, radio waves are confined within the non-distribution region 40, and this space thus serves as a resonator 42R.

FIG. 13B is an image illustrates the simulation results on electric field strength. In FIG. 13B, the electric field strength is represented by shades of gray. As can be appreciated, the electric field seeps out to the location of the plurality of members 25 positioned in the innermost part of the area surrounding the non-distribution region 40. This indicates that radio waves are confined substantially within the non-distribution region 40.

Advantageous effects of the fourth embodiment are now described below. As with the electronic component according to the first embodiment, the electronic component according to the fourth embodiment, which includes the resonator 42R, also allows for reduced deflection of the conductive members 20.

Figure 14A:
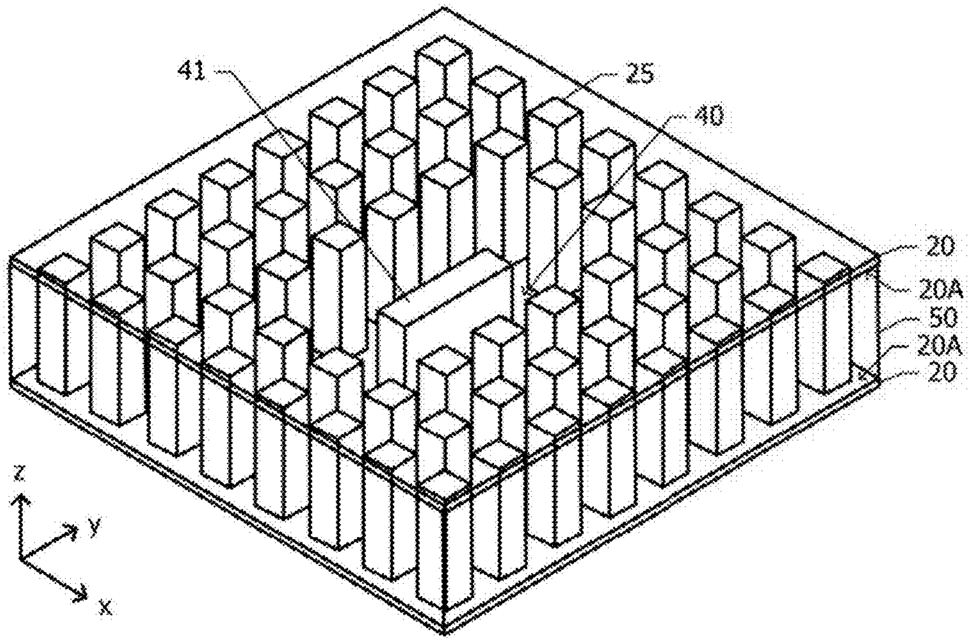
FIG. 14A is a partially see-through perspective view of an electronic component according to a modification of the fourth embodiment.
Figure 14B:
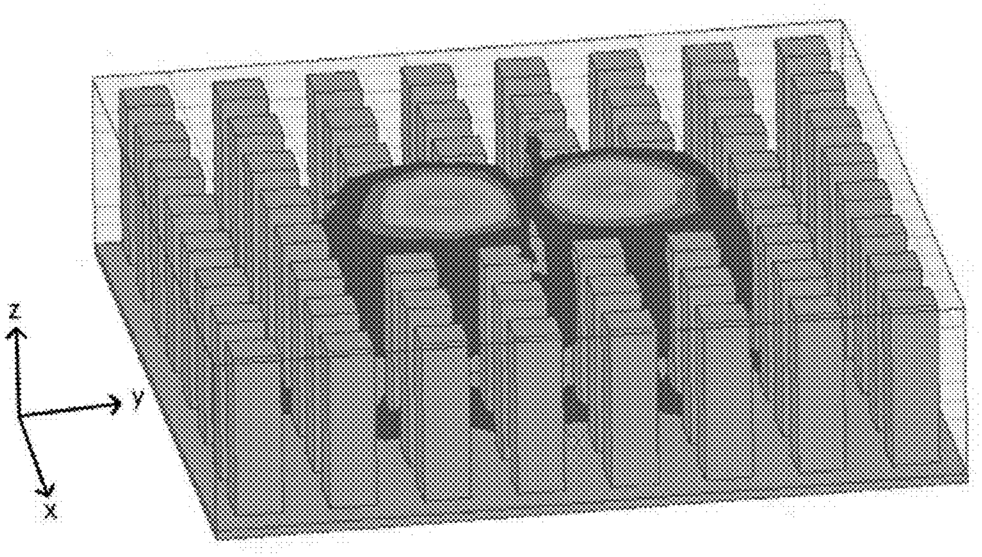
FIG. 14B is an image that illustrates the simulation results on electric field strength.

Reference is now made to FIGS. 14A and 14B to describe an electronic component according to a modification of the fourth embodiment.

FIG. 14A is a partially see-through perspective view of the electronic component according to the modification of the fourth embodiment. A ridge member 41, which extends in the y-direction, is disposed at the non-distribution region 40. As with the ridge member 31 of the electronic component according to the modification of the second embodiment illustrated in FIG. 10B, the ridge member 41 is in contact with one conductive surface 20A. The ridge member 41 has a length (dimension in the y-direction) equal to one-half of the wavelength of a target radio wave. For example, the ridge member 41 has a length greater than or equal to one-half of the period of the members 25 in the x-direction, and less than or equal to the period of the members 25 in the x-direction. The ridge member 41 and one conductive surface 20A define a waveguide that serves as a half-wavelength resonator.

FIG. 14B is an image illustrates the simulation results on electric field strength. In FIG. 14B, the electric field strength is represented by shades of gray. It can be appreciated that the electric field is concentrated in each end portion of the waveguide that is defined by the ridge member 41 and one conductive surface 20A, and thus resonance is occurring.

Fifth Embodiment

Figure 15A:
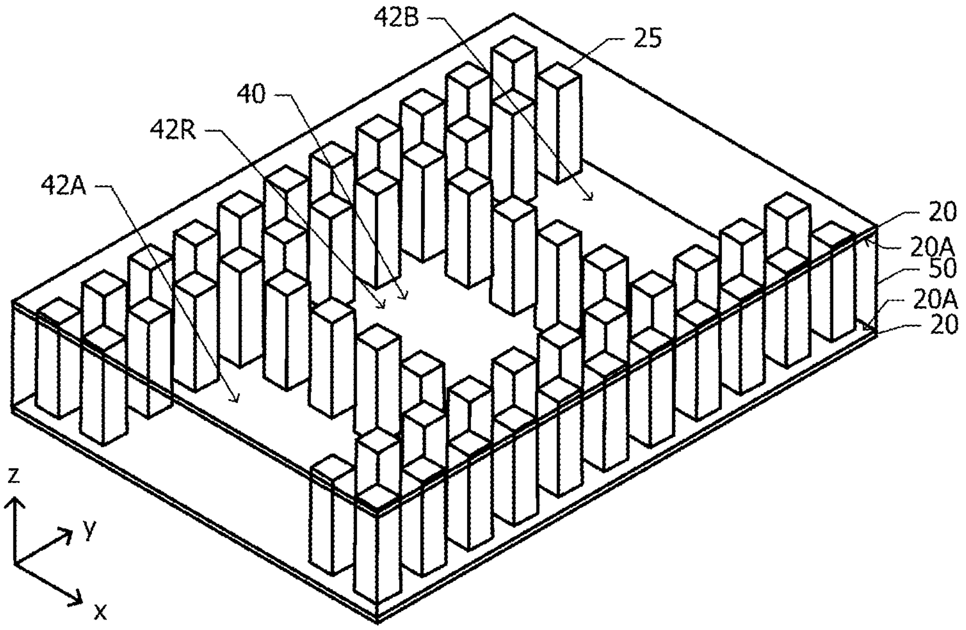
FIG. 15A is a partially see-through perspective view of an electronic component according to a fifth embodiment.
Figure 15B:
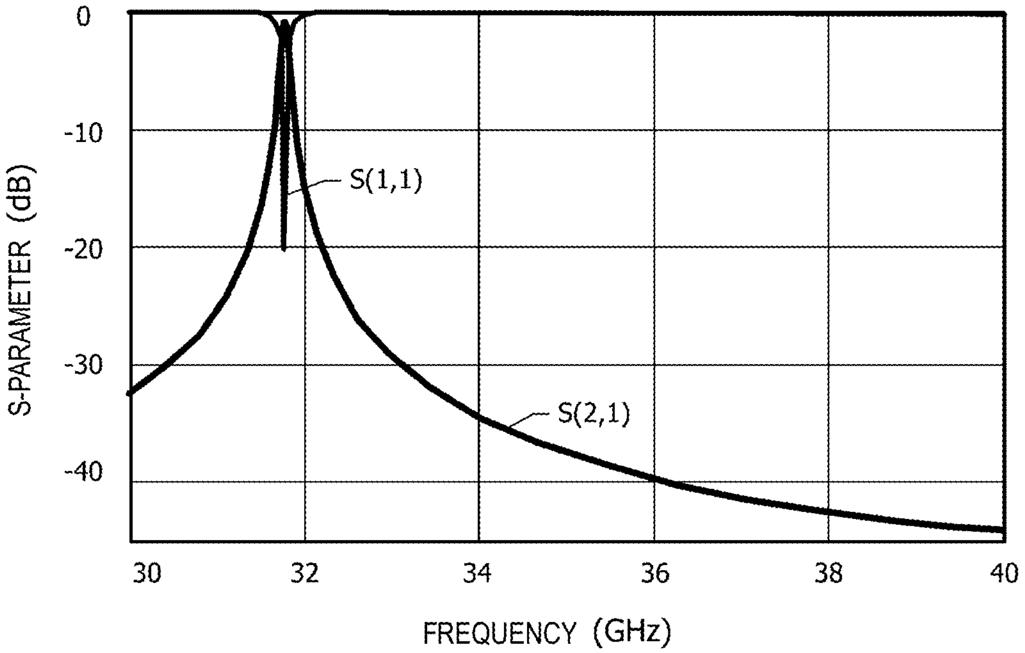
FIG. 15B is a graph illustrating filter characteristics determined through an electric field simulation performed on the electronic component according to the fifth embodiment.

Reference is now made to FIGS. 15A and 15B to describe an electronic component according to a fifth embodiment. In the following description, structural features identical to those of the electronic component according to the fourth embodiment described above with reference to FIGS. 13A and 13B are not described in further detail.

FIG. 15A is a partially see-through perspective view of the electronic component according to the fifth embodiment. According to the fourth embodiment (FIG. 13A), the non-distribution region 40 serving as the resonator 42R is isolated. According to the fifth embodiment, by contrast, two waveguides 42A and 42B coupled to the resonator 42R defined by the non-distribution region 40 are provided. One waveguide 42A extends from the non-distribution region 40 in the negative direction of the y-axis, and the other waveguide 42B extends from the non-distribution region 40 in the positive direction of the y-axis.

Each of the waveguides 42A and 42B is sandwiched by the members 25 arranged periodically in the direction of wave guiding (y-direction). Each of the waveguides 42A and 42B, and the resonator 42R are coupled via the plurality of members 25 arranged periodically in one row. The resonator 42R serves as a filter for a signal that propagates from one waveguide 42A to the other waveguide 42B.

FIG. 15B is a graph illustrating filter characteristics determined through an electric field simulation performed on the electronic component according to the fifth embodiment. The horizontal axis represents frequency in units of "GHz", and the vertical axis represents scattering (S) parameter value in units of "dB." In the electromagnetic field simulation, a radio-frequency signal is sent from one waveguide 42A to the other waveguide 42B, and a reflection coefficient S(1, 1) and a transmission coefficient S(2, 1) are determined. FIG. 15B illustrates the simulation results on the reflection coefficient S(1, 1) and the transmission coefficient S(2, 1).

At the frequency of 31.78 GHz, the reflection coefficient S(1, 1) exhibits its minimum value, and the transmission coefficient S(2, 1) exhibits its maximum value. It is thus confirmed that as illustrated in FIG. 15B, the electronic component according to the fifth embodiment acts as a filter.

Advantageous effects of the fifth embodiment are now described below. As with the electronic component according to the first embodiment, the electronic component according to the fifth embodiment, which includes the waveguides 42A and 42B and the resonator 42R, also allows for reduced deflection of the conductive members 20.

An electronic component according to a modification of the fifth embodiment is now described below.

According to the fifth embodiment, the two waveguides 42A and 42B extend in the y-direction from the resonator 42R. In an alternative configuration, one waveguide 42A may extend in the y-direction from the resonator 42R, and the other waveguide 42B may extend in the x-direction from the resonator 42R. This configuration results in the waveguides 42A and 42B being bent at right angles relative to each other with the resonator 42R as the location of the bend.

Sixth Embodiment

Figure 16A:
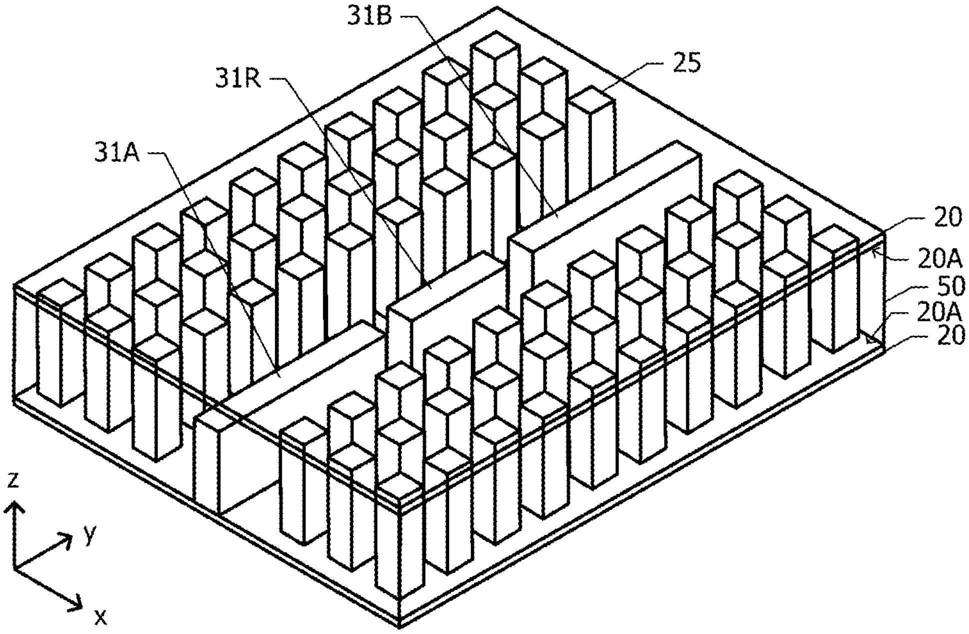
FIG. 16A is a partially see-through perspective view of an electronic component according to a sixth embodiment.
Figure 16B:
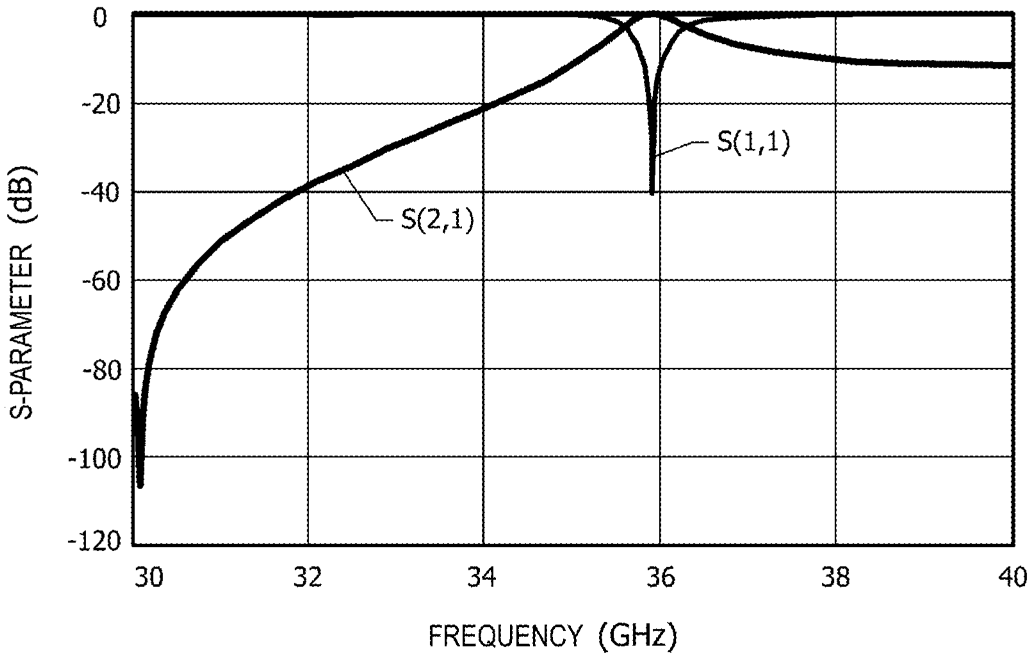
FIG. 16B is a graph illustrating filter characteristics determined through an electric field simulation performed on the electronic component according to the sixth embodiment.

Reference is now made to FIGS. 16A and 16B to describe an electronic component according to a sixth embodiment. In the following description, structural features identical to those of the electronic component according to the modification of the second embodiment described above with reference to FIGS. 10A and 10B are not described in further detail.

FIG. 16A is a partially see-through perspective view of the electronic component according to the sixth embodiment. According to the modification of the second embodiment described above with reference to FIGS. 10A and 10B, a single ridge member 31 is disposed at the non-distribution region 30. According to the sixth embodiment, by contrast, the ridge member 31 is divided in the y-direction into three ridge parts 31A, 31R, and 31B. The three ridge parts 31A, 31R, and 31B each define a waveguide. The waveguide defined by the middle ridge part 31R serves as a half-wavelength resonator.

The waveguide defined by one ridge part 31A of the ridge member 31 is coupled to the waveguide defined by another ridge part 31B, via the half-wavelength resonator defined by the middle ridge part 31R. As with the electronic component according to the fifth embodiment (FIG. 15A), the electronic component according to the sixth embodiment serves as a filter.

FIG. 16B is a graph illustrating filter characteristics determined through an electric field simulation performed on the electronic component according to the sixth embodiment. The horizontal axis represents frequency in units of "GHz", and the vertical axis represents S-parameter value in units of "dB." In the electromagnetic field simulation, a radio-frequency signal is sent from the waveguide defined by one ridge part 31A to the waveguide defined by another ridge part 31B, and the reflection coefficient S(1, 1) and the transmission coefficient S(2, 1) are determined. FIG. 16B illustrates the simulation results on the reflection coefficient S(1, 1) and the transmission coefficient S(2, 1).

At the frequency of 35.88 GHz, the reflection coefficient S(1, 1) exhibits its minimum value, and the transmission coefficient S(2, 1) exhibits its maximum value. It is thus confirmed that as illustrated in FIG. 16B, the electronic component according to the sixth embodiment acts as a filter.

Advantageous effects of the sixth embodiment are now described below. As with the electronic component according to the modification (FIG. 10A, 10B) of the second embodiment, the electronic component according to the sixth embodiment including the three ridge parts 31A, 31R, and 31B also allows for reduced deflection of the conductive members 20.

Seventh Embodiment

Figure 17A:
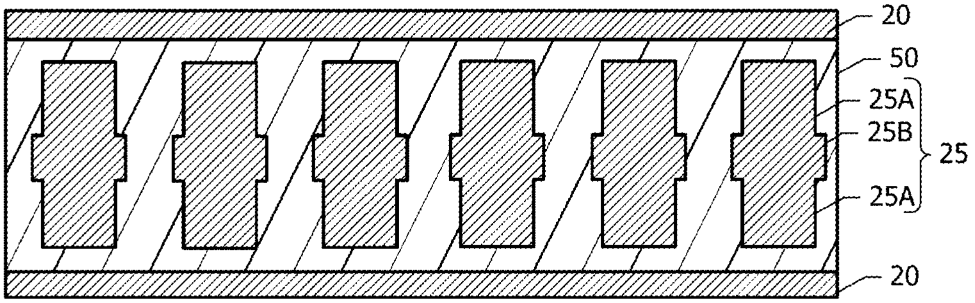
FIGS. 17A and 17B are respectively a cross-sectional view of an electronic component according to a seventh embodiment, and a cross-sectional view of an electronic component according to a modification of the seventh embodiment.

Reference is now made to FIG. 17A to describe an electronic component according to a seventh embodiment. In the following description, structural features identical to those of the electronic component according to the first embodiment described above with reference to FIGS. 1A to 2D are not described in further detail.

FIG. 17A is a cross-sectional view of the electronic component according to the seventh embodiment. According to the first embodiment (FIG. 1A, 1B), each of the members 25 is in the form of a quadrangular prism with a uniform thickness from one end portion to the other end portion in the z-direction. According to the seventh embodiment, by contrast, each of the members 25 includes a relatively thick middle portion 25B, and a relatively thin portion 25A located on each side of the middle portion 25B.

Reference is now made to a manufacturing method for the electronic component according to the seventh embodiment.

In the mid-manufacture stage of the electronic component according to the first embodiment illustrated in FIG. 2B, three dielectric plates each provided with a plurality of through-holes are stacked together to fabricate the dielectric base member 50A including the through-holes 50B. At this time, the through-holes in the middle dielectric plate are made thicker than the through-holes in the dielectric plate located on each side of the middle dielectric plate. Subsequently, a molten metal is poured into each through-hole 50B, and allowed to solidify. A composite member including the members 25 and the dielectric base member 50A is thus obtained.

Advantageous effects of the seventh embodiment are now described below. As with the first embodiment, the seventh embodiment also makes it possible to reduce deflection of the conductive members 20. Further, due to the member 25 being thicker in the middle portion 25B, the member 25 can be securely supported onto the dielectric base member 50A.

Figure 17B:
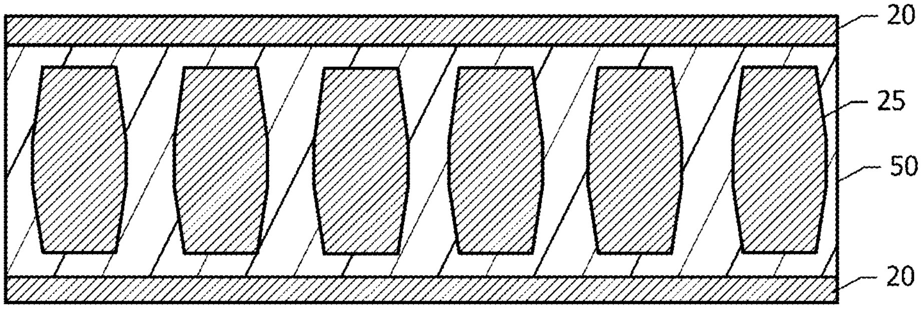

Reference is now made to FIG. 17B to describe an electronic component according to a modification of the seventh embodiment.

FIG. 17B is a cross-sectional view of the electronic component according to the modification of the seventh embodiment. According to the seventh embodiment, the thickness of the member 25 changes discontinuously at the interface between the middle portion 25B, and the thin portion 25A located in each end portion of the member 25. According to the modification illustrated in FIG. 17B, by contrast, the thickness of the member 25 gradually increases toward the middle from each end portion of the member 25 in the z-direction. As with the seventh embodiment, this modification also allows the member 25 to be securely supported onto the dielectric base member 50A.

Eighth Embodiment

Figure 18:
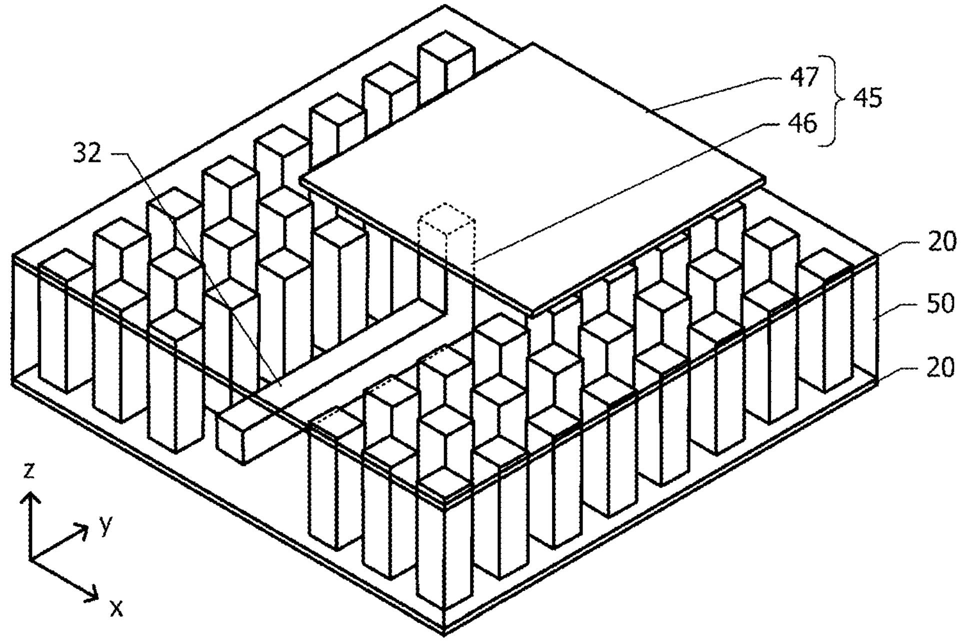
FIG. 18 is a partially see-through perspective view of an electronic component according to an eighth embodiment.

Reference is now made to FIG. 18 to describe an electronic component according to an eighth embodiment. In the following description, structural features identical to those of the electronic component according to the modification of the second embodiment described above with reference to FIGS. 11A and 11B are not described in further detail.

FIG. 18 is a partially see-through perspective view of the electronic component according to the eighth embodiment. According to the eighth embodiment, an antenna structure 45 is added to the electronic component according to the modification (FIG. 11A, 11B) of the second embodiment. The antenna structure 45 includes a radiating element 47, and a feeder line 46. The radiating element 47 is in the form of a conductor plate spaced apart from one conductive member 20. The radiating element 47 and the one conductive member 20 constitute a patch antenna.

The feeder line 46 extends through the one conductive member 20 from the core member 32, and reaches the radiating element 47. A portion of the conductive member 20 through which the core member 32 extends is provided with an opening to ensure insulation therebetween. Power is supplied to the radiating element 47 through the core member 32 and the feeder line 46. In other words, the antenna structure 45 is excited by an electromagnetic wave guided in a waveguide including the core member 32.

Advantageous effects of the eighth embodiment are now described below. As with the modification (FIG. 11A, 11B) of the second embodiment, the eighth embodiment also makes it possible to reduce deflection of the conductive members 20.

Ninth Embodiment

Figure 19:
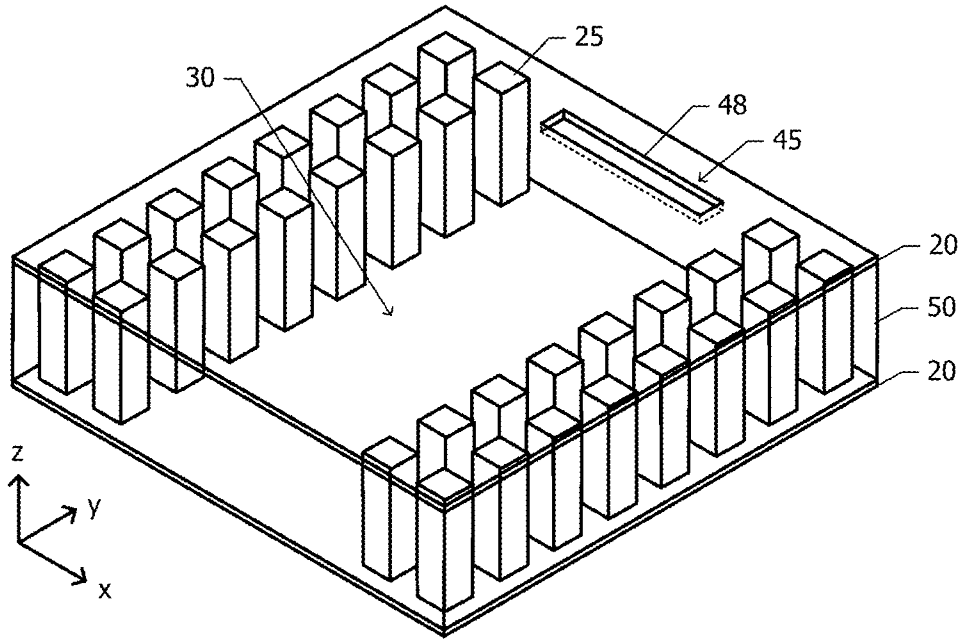
FIG. 19 is a partially see-through perspective view of an electronic component according to a ninth embodiment.

Reference is now made to FIG. 19 to describe an electronic component according to a ninth embodiment. In the following description, structural features identical to those of the electronic component according to the second embodiment described above with reference to FIGS. 9A and 9B are not described in further detail.

FIG. 19 is a partially see-through perspective view of the electronic component according to the ninth embodiment. According to the ninth embodiment, the antenna structure 45 is added to the electronic component according to the second embodiment (FIG. 9A, 9B). The antenna structure 45 includes a slot 48 provided in one conductive member 20. The slot 48 defines a slot antenna. In plan view of the x-y plane, the slot 48 is located inside the non-distribution region 30. The antenna structure 45 is excited by an electromagnetic wave guided in a waveguide extending along the non-distribution region 30.

Advantageous effects of the eighth embodiment are now described below. As with the second embodiment (FIG. 9A, 9B), the nineth embodiment also makes it possible to reduce deflection of the conductive members 20.

It is needless to mention that the above-mentioned embodiments are for illustrative purposes only, and features described in different embodiments may be substituted for or combined with each another. The same or similar operational effects provided by the same or similar features according to a plurality of embodiments are not mentioned for each individual embodiment. Further, the present invention is not limited to the above-mentioned embodiments. For example, various modifications, improvements, or combinations of the invention will be apparent to those skilled in the art.

REFERENCE SIGNS LIST

20 conductive member
20A conductive surface
25 periodically arranged members
25A relatively thin portion
25B middle portion
26 connecting part
27 lump of metal
30 non-distribution region
31 ridge member
31A, 31B, 31R ridge part
32 core member
33 transmission line
40 non-distribution region
41 ridge member
42A, 42B waveguide
42R resonator
45 antenna structure
46 feeder line
47 radiating element
48 slot
50 dielectric member
50A dielectric base member
50B through-hole
50C dielectric film
50D dielectric portion
60 mold
60A recess in mold
62 single-sided copper clad sheet

The invention claimed is:

1. An electronic component comprising:

a pair of first members each having a conductive surface with electrical conductivity, the conductive surface of one of the pair of first members and the conductive surface of an other one of the pair of first members oriented to oppose each other; and a plurality of second members disposed between the pair of first members and each of the plurality of second members is made of a conductive material with electrical conductivity, wherein the plurality of second members are arranged in a periodic pattern in at least one direction parallel to the conductive surface, wherein each of the plurality of second members is disposed between the pair of first members, wherein the electronic component further comprises a dielectric member disposed between each of the plurality of second members and each of the pair of first members such that each of the plurality of second members is spaced apart from each of the pair of first members by the dielectric member, the dielectric member being in contact with the plurality of second members and with the pair of first members, wherein the plurality of second members are arranged in the periodic pattern in a first direction on both sides of a non-distribution region of at least one of the pair of first members, the non-distribution region being a portion of the conductive surface and also elongated in the first direction, wherein the non-distribution region has a width greater than or equal to twice a spacing between adjacent members of the plurality of second members in the first direction.

2. The electronic component according to claim 1, wherein the dielectric member is disposed between the pair of first members with the dielectric member extending from one of the pair of first members to an other one of the pair of first members.

3. The electronic component according to claim 2, wherein in a direction perpendicular to the conductive surface of one of the pair of first members, each of the plurality of second members is thicker in a middle portion than in a portion other than the middle portion.

4. The electronic component according to claim 1, further comprising a ridge member having electrical conductivity, the ridge member being disposed at the non-distribution region and extending in the first direction, wherein the ridge member is in contact with one of the pair of first members, and wherein the ridge member and an other one of the pair of first members have a spacing between each other that is greater than a spacing between each of the plurality of second members and each of the pair of first members.

5. The electronic component according to claim 4, wherein the ridge member is divided in the first direction into at least three ridge parts including a middle ridge part, and wherein the middle ridge part has a dimension in the first direction that is greater than one-half of a period of spacing of the plurality of second members in the first direction, and that is less than the period of spacing of the plurality of second members in the first direction.

6. The electronic component according to claim 5, further comprising an antenna structure that is excited by an electromagnetic wave guided between the pair of first members.

7. The electronic component according to claim 4, further comprising an antenna structure that is excited by an electromagnetic wave guided between the pair of first members.

8. The electronic component according to claim 4, wherein in a direction perpendicular to the conductive surface of one of the pair of first members, each of the plurality of second members is thicker in a middle portion than in a portion other than the middle portion.

9. The electronic component according to claim 1, wherein the electronic component comprises a core member disposed at the non-distribution region between the pair of first members, the core member having electrical conductivity and extending in the first direction, and wherein the core member and each of the pair of first members have a spacing between each other that is greater than a spacing between each of the plurality of second members and each of the pair of first members.

10. The electronic component according to claim 9, further comprising an antenna structure that is excited by an electromagnetic wave guided between the pair of first members.

11. The electronic component according to claim 1, further comprising an antenna structure that is excited by an electromagnetic wave guided between the pair of first members.

12. The electronic component according to claim 1, wherein in a direction perpendicular to the conductive surface of one of the pair of first members, each of the plurality of second members is thicker in a middle portion than in a portion other than the middle portion.

13. An electronic component, comprising:

a pair of first members each having a conductive surface with electrical conductivity, the conductive surface of one of the pair of first members and the conductive surface of an other one of the pair of first members oriented to oppose each other; and a plurality of second members disposed between the pair of first members and each of the plurality of second members is made of a conductive material with electrical conductivity, wherein the plurality of second members are arranged in a periodic pattern in at least one direction parallel to the conductive surface, wherein each of the plurality of second members is disposed between the pair of first members, wherein the electronic component further comprises a dielectric member disposed between each of the plurality of second members and each of the pair of first members such that each of the plurality of second members is spaced apart from each of the pair of first members by the dielectric member, the dielectric member being in contact with the plurality of second members and with the pair of first members, wherein the plurality of second members are arranged periodically in a first direction and a second direction, the first direction and the second direction being parallel to the conductive surface and perpendicular to each other, wherein each of the plurality of second members, and one of the pair of first members have a spacing between each other that is greater than a spacing between each of the plurality of second members and an other one of the pair of first members, and wherein the electronic component further comprises a transmission line, the transmission line being disposed between one of the pair of first members, and the plurality of second members, the one of the pair of first members being at a greater distance from each of the plurality of second members than is an other one of the pair of first members, the transmission line extending in the first direction.

14. The electronic component according to claim 13, further comprising an antenna structure that is excited by an electromagnetic wave guided between the pair of first members.

15. An electronic component, comprising:

a pair of first members each having a conductive surface with electrical conductivity, the conductive surface of one of the pair of first members and the conductive surface of an other one of the pair of first members oriented to oppose each other; and a plurality of second members disposed between the pair of first members and each of the plurality of second members is made of a conductive material with electrical conductivity wherein the plurality of second members are arranged in a periodic pattern in at least one direction parallel to the conductive surface, wherein each of the plurality of second members is disposed between the pair of first members, wherein the electronic component further comprises a dielectric member disposed between each of the plurality of second members and each of the pair of first members such that each of the plurality of second members is spaced apart from each of the pair of first members by the dielectric member, the dielectric member being in contact with the plurality of second members and with the pair of first members, wherein the periodic pattern includes the plurality of second members being spaced periodically in a first direction and spaced periodically in a second direction at a region surrounding a non-distribution region of at least one of the pair of first members, the non-distribution region being a portion of the conductive surface, the first direction and the second direction being parallel to the conductive surface and perpendicular to each other, and wherein the non-distribution region has a dimension in the first direction and a dimension in the second direction that are respectively greater than or equal to twice a period of spacing of the plurality of second members in the first direction and twice a period of spacing of the plurality of second members in the second direction.

16. The electronic component according to claim 15, further comprising a ridge member disposed at the non-distribution region, the ridge member being elongated in the first direction, wherein the ridge member is in contact with one of the pair of first members, and wherein the ridge member and an other one of the pair of first members have a spacing between each other that is greater than a spacing between each of the plurality of second members and each of the pair of first members.

17. The electronic component according to claim 15, further comprising:

two waveguides extending in the first direction or the second direction from the non-distribution region, wherein each of the two waveguides is sandwiched by the plurality of second members that are arranged in the periodic pattern and along a propagation direction of a radio wave in at least one of the two waveguides.

18. The electronic component according to claim 15, further comprising an antenna structure that is excited by an electromagnetic wave guided between the pair of first members.

19. An electronic component, comprising:

a pair of first members each having a conductive surface with electrical conductivity, the conductive surface of one of the pair of first members and the conductive surface of an other one of the pair of first members oriented to oppose each other; and a plurality of second members disposed between the pair of first members and each of the plurality of second members is made of a conductive material with electrical conductivity wherein the plurality of second members are arranged in a periodic pattern in at least one direction parallel to the conductive surface, wherein each of the plurality of second members is disposed between the pair of first members, wherein the electronic component further comprises a dielectric member disposed between each of the plurality of second members and each of the pair of first members such that each of the plurality of second members is spaced apart from each of the pair of first members by the dielectric member, the dielectric member being in contact with the plurality of second members and with the pair of first members, and wherein in a direction perpendicular to the conductive surface of one of the pair of first members, each of the plurality of second members is thicker in a middle portion than in a portion other than the middle portion.

* * * * *